(12) United States Patent
    Chiang et al.

(10) Patent No.: US 11,436,860 B2
(45) Date of Patent: Sep. 6, 2022

(54) METHOD, DEVICE, AND NON-TRANSITORY COMPUTER-READABLE STORAGE MEDIUM FOR FINGERPRINT AUTHENTICATION

(71) Applicant: Egis Technology Inc., Taipei (TW)

(72) Inventors: Yuan-Lin Chiang, Taipei (TW); Jian-Hua Wang, Taipei (TW)

(73) Assignee: EGIS TECHNOLOGY INC., Taipei (TW)

( * ) Notice: Subject to any disclaimer, the term of this patent is extended or adjusted under 35 U.S.C. 154(b) by 0 days.

(21) Appl. No.: 17/459,103

(22) Filed: Aug. 27, 2021

(65) Prior Publication Data

US 2022/0207257 A1    Jun. 30, 2022

Related U.S. Application Data

(60) Provisional application No. 63/130,864, filed on Dec. 28, 2020.

(30) Foreign Application Priority Data

May 17, 2021  (CN) .......................... 202110535281.0

(51) Int. Cl.
    *G06V 40/12*    (2022.01)
    *G06K 9/62*     (2022.01)
    *G06V 40/50*    (2022.01)

(52) U.S. Cl.
    CPC ....... *G06V 40/1335* (2022.01); *G06K 9/6257* (2013.01); *G06V 40/1359* (2022.01); *G06V 40/1376* (2022.01); *G06V 40/1388* (2022.01); *G06V 40/50* (2022.01)

(58) Field of Classification Search
    CPC .......... G06V 40/1335; G06V 40/1359; G06V 40/1376; G06V 40/1388; G06V 40/50; G06K 9/6257
    See application file for complete search history.

(56) References Cited

U.S. PATENT DOCUMENTS

| 2013/0058544 | A1  | 3/2013 | Sayac et al. |
| 2017/0032169 | A1* | 2/2017 | Pi ............................. G06V 40/45 |
| 2018/0129862 | A1* | 5/2018 | Chiang .............. G06V 40/1353 |
| 2019/0019048 | A1* | 1/2019 | Deng .................... H04L 9/3231 |

FOREIGN PATENT DOCUMENTS

| CN | 106796650 A | 5/2017 |
| CN | 109074489 A | 12/2018 |
| CN | 110705481 A | 1/2020 |

* cited by examiner

*Primary Examiner* — Abhishek Sarma
(74) *Attorney, Agent, or Firm* — The PL Law Group, PLLC

(57) ABSTRACT

A method for fingerprint authentication according to an embodiment of the present disclosure includes, in response to receiving an authentication request, performing fingerprint image acquisition and comparison of a first mode, and selectively performing fingerprint image acquisition and comparison of a second mode, and performing authentication at least based on a comparison result of the first mode. In the first mode, a fingerprint image generated by a pressing operation of a target finger in a fingerprint acquisition area is acquired, and in the second mode, a fingerprint image sequence generated by a sliding operation of the target finger in the fingerprint acquisition area is acquired. A selective fingerprint authentication security mode can be provided as needed, so as to meet various authentication requirements.

28 Claims, 20 Drawing Sheets

METHOD, DEVICE, AND NON-TRANSITORY COMPUTER-READABLE STORAGE MEDIUM FOR FINGERPRINT AUTHENTICATION

CROSS-REFERENCE TO RELATED APPLICATION(S)

This application claims the benefit under 35 USC § 119(a) of U.S. Patent Application No. 63/130,864 filed on Dec. 28, 2020, Chinese Patent Application No. 202110535281.0 filed on May 17, 2021, in the Chinese Intellectual Property Office, the entire disclosure of which is incorporated herein by reference for all purposes.

TECHNICAL FIELD

The present disclosure generally relates to the technical field of fingerprint identification. More particularly, the present disclosure relates to a method, device, and non-transitory computer-readable storage medium for fingerprint authentication.

BACKGROUND

With the continuous development of information technology, information security becomes more and more important. Regardless of portable electronic device or access control device, etc., identity authentication of users has become a trend, and accordingly, fingerprint identification technology also comes into being. However, fingerprint imitation technology appeared nowadays can cheat a fingerprint identification system by copying fingerprint information on a fake finger for the purpose of trespass. Therefore, how to improve the accuracy and security of fingerprint authentication becomes a technical problem to be solved urgently.

SUMMARY

In view of the above-mentioned technical problem, technical solutions of the present disclosure provide, in various aspects, a method, device, and non-transitory computer-readable storage medium for fingerprint authentication.

In a first aspect of the present disclosure, there is provided a method for fingerprint authentication, including: in response to receiving an authentication request, performing fingerprint image acquisition and comparison of a first mode, and selectively performing fingerprint image acquisition and comparison of a second mode, wherein in the first mode, a fingerprint image generated by a pressing operation of a target finger in a fingerprint acquisition area is acquired, and in the second mode, a fingerprint image sequence generated by a sliding operation of the target finger in the fingerprint acquisition area is acquired; and performing authentication at least based on a comparison result of the first mode.

In an embodiment of the present disclosure, the method further includes: in response to the authentication request being at a normal level, performing authentication based on the comparison result of the first mode.

In another embodiment of the present disclosure, the method further includes: in response to the authentication request being at a strict level, performing authentication based on the comparison results of the first mode and of the second mode.

In still another embodiment of the present disclosure, the method further includes: in the first mode, comparing the fingerprint image with enrolled fingerprint information for fingerprint identification; and/or in the second mode, performing real/fake finger identification based on the fingerprint image sequence.

In an embodiment of the present disclosure, before performing fingerprint image acquisition and comparison of the first mode, the method further includes: presenting a prompt message for instructing the target finger to perform at least the pressing operation.

In another embodiment of the present disclosure, after in response to the authentication request being at a strict level, the method further includes: presenting a prompt message for instructing the target finger to perform the sliding operation; or presenting a prompt message for instructing the target finger to press first and then slide.

In still another embodiment of the present disclosure, the method further includes: in response to the comparison result of the first mode being passed, determining a level of the authentication request; and in response to the level being a strict level, presenting a prompt message for instructing the target finger to perform the sliding operation.

In an embodiment of the present disclosure, the method further includes: upon receiving the authentication request, determining a level of the authentication request; in response to the level being a strict level, presenting a prompt message for instructing the target finger to perform the pressing operation; and in response to the comparison result of the first mode being passed, presenting a prompt message for instructing the target finger to perform the sliding operation.

In another embodiment of the present disclosure, the method further includes: upon receiving the authentication request, determining a level of the authentication request; and in response to the level being a strict level, presenting a prompt message for instructing the target finger to perform a pressing-first-then-sliding operation.

In still another embodiment of the present disclosure, that performing fingerprint image acquisition and comparison of a second mode includes: in response to the sliding operation of the target finger in the fingerprint acquisition area, acquiring the fingerprint image sequence generated by the target finger in a sliding process; extracting static features of each fingerprint image in the fingerprint image sequence and/or dynamic features of the fingerprint image sequence; and determining whether the target finger is a fake finger based on the static features and/or the dynamic features.

In an embodiment of the present disclosure, that extracting static features includes at least one of: generating a global gray level distribution of the fingerprint image; generating a local gray level distribution of the fingerprint image; and extracting burr features of ridges in the fingerprint image.

In another embodiment of the present disclosure, that extracting dynamic features includes at least one of: counting the number of fingerprint images containing partial non-fingerprint areas in the fingerprint image sequence; counting the number of fingerprint images without fingerprint information in the fingerprint image sequence; counting a signal intensity difference between previous and later fingerprint images in the fingerprint image sequence; and determining a continuous matching hit state of the fingerprint image sequence.

In still another embodiment of the present disclosure, that counting a signal intensity difference between previous and later fingerprint images in the fingerprint image sequence includes: calculating standard deviations or standard deviation means of signal intensity distributions of the fingerprint images in the fingerprint image sequence within previous and later different time periods; and comparing a difference between the standard deviations or the standard deviation means to obtain the signal intensity difference.

In an embodiment of the present disclosure, that determining a continuous matching hit state of the fingerprint image sequence includes: matching each fingerprint image in the fingerprint image sequence with enrolled fingerprint information to generate a matching result; in response to the matching result conforming to a first pattern, determining that the fingerprint image sequence is in the continuous matching hit state; and in response to the matching result conforming to a second pattern, determining that the fingerprint image sequence is in a non-continuous matching hit state.

In another embodiment of the present disclosure, that determining whether the target finger is a fake finger based on the static features and/or the dynamic features includes: based on the static features and/or the dynamic features, judging whether the target finger is a fake finger using a machine model trained in advance or according to a preset logic.

In still another embodiment of the present disclosure, the preset logic includes determining the finger as a fake finger when at least one of the following is satisfied: a percentage of the number of fingerprint images in the fingerprint image sequence which are confirmed to belong to fake fingers based on the static features exceeding a first threshold; the number of fingerprint images containing partial non-fingerprint areas in the fingerprint image sequence being less than a second threshold; the number of fingerprint images without fingerprint information in the fingerprint image sequence being greater than a third threshold; a signal intensity difference between previous and later fingerprint images in the fingerprint image sequence being less than a fourth threshold; and the fingerprint image sequence being in a non-continuous matching hit state.

In an embodiment of the present disclosure, that confirming the finger as a fake finger based on the static features includes: according to the static features of each fingerprint image, detecting whether each fingerprint image has fake finger features; and in response to detecting the fake finger features, confirming that the fingerprint image belongs to a fake finger.

In another embodiment of the present disclosure, the fake finger features include at least one of: a distribution range of a global gray level distribution of the fingerprint image being less than a fifth threshold; a distribution range of a local gray level distribution of the fingerprint image being less than a sixth threshold; and ridges in the fingerprint image having burr features.

In a second aspect of the present disclosure, there is provided a device for fingerprint authentication, including a fingerprint acquisition apparatus and a processor, wherein: the processor is configured to: in response to receiving an authentication request, control the fingerprint acquisition apparatus to perform fingerprint image acquisition in a first mode and perform comparison in the first mode based on an acquired fingerprint image, and selectively control the fingerprint acquisition apparatus to perform fingerprint image acquisition in a second mode and perform comparison in the second mode based on an acquired fingerprint image sequence; and perform authentication at least based on a comparison result of the first mode; and the fingerprint acquisition apparatus is configured to: in the first mode, acquire the fingerprint image generated by a pressing operation of a target finger in a fingerprint acquisition area; or in the second mode, acquire the fingerprint image sequence generated by a sliding operation of the target finger in the fingerprint acquisition area.

In an embodiment of the present disclosure, the processor is further configured to: in response to the authentication request being at a normal level, perform authentication based on the comparison result of the first mode.

In another embodiment of the present disclosure, the processor is further configured to: in response to the authentication request being at a strict level, perform authentication based on the comparison results of the first mode and of the second mode.

In still another embodiment of the present disclosure, the processor is further configured to: in the first mode, compare the fingerprint image and enrolled fingerprint information for fingerprint identification; and/or in the second mode, perform real/fake finger identification based on the fingerprint image sequence.

In an embodiment of the present disclosure, the device further includes: a human-machine interface configured to present, under control of the processor, a prompt message for instructing the target finger to perform at least the pressing operation before performing fingerprint image acquisition of the first mode.

In another embodiment of the present disclosure, the device further includes: a human-machine interface configured to present, under control of the processor, a prompt message for instructing the target finger to perform a sliding operation after in response to the authentication request being at a strict level; or presenting a prompt message for instructing the target finger to press first then slide.

In still another embodiment of the present disclosure, the processor is further configured to: in response to the comparison result of the first mode being passed, determine a level of the authentication request; and the device further includes: a human-machine interface configured to present, under control of the processor, a prompt message for instructing the target finger to perform the sliding operation after in response to the level being a strict level.

In an embodiment of the present disclosure, the processor is further configured to: upon receiving the authentication request, determine a level of the authentication request; and the device further includes: a human-machine interface configured to present, under control of the processor, a prompt message for instructing the target finger to perform the pressing operation after in response to the level being a strict level; and upon in response to the comparison result of the first mode being passed, presenting a prompt message for instructing the target finger to perform the sliding operation.

In another embodiment of the present disclosure, the processor is further configured to: upon receiving the authentication request, determining a level of the authentication request; and the device further includes: a human-machine interface configured to present, under control of the processor, a prompt message for instructing the target finger to perform a pressing-first-then-sliding operation after in response to the level being a strict level.

In a third aspect of the present disclosure, there is provided a non-transitory computer-readable storage medium having stored thereon program instructions for fingerprint authentication, which when executed by at least one processor, cause to: in response to receiving an authentication request, control performing fingerprint image acquisition and comparison in a first mode and selectively performing fingerprint image acquisition and comparison in a second mode, wherein in the first mode, a fingerprint image generated by a pressing operation of a target finger in a fingerprint acquisition area is acquired, and in the second mode, a fingerprint image sequence generated by a sliding operation of the target finger in the fingerprint acquisition area is acquired; and perform authentication at least based on a comparison result of the first mode.

Through the above description of the technical solutions of the present disclosure and a plurality of the embodiments thereof, it can be understand by those skilled in the art that, the method for fingerprint authentication in the present disclosure can perform authentication at least based on the comparison result of the fingerprint image acquired in the first mode, and can also selectively perform comparison of the fingerprint image sequence acquired in the second mode, so as to achieve fingerprint authentication. Since the fingerprint image sequence generated by the sliding operation of the target finger is acquired in the second mode, action requirements on the target finger and the authentication complexity are improved, and thus, the security and reliability of the fingerprint authentication method can be improved when the second mode is selected. Furthermore, by selectively performing fingerprint image acquisition and comparison of the second mode, a selective fingerprint authentication security mode can be provided according to information security requirements, so as to meet various authentication requirements.

BRIEF DESCRIPTION OF THE DRAWINGS

Above and other objectives, features and advantages of the exemplary embodiments of the present disclosure will become readily apparent from the following detailed description, which proceeds with reference to the accompanying drawings. In the accompanying drawings, several embodiments of the present disclosure are illustrated by way of example rather than limitation, and identical or corresponding reference numerals indicate identical or corresponding parts, in which.

DETAILED DESCRIPTION

The technical solutions in the embodiments of the present disclosure will be clearly and completely described below with reference to the accompanying drawings in the embodiments of the present disclosure. Obviously, the described embodiments are only some of the embodiments of the present disclosure, but not all of them. All other embodiments, which can be derived by those skilled in the art from the embodiments of the present disclosure without making any creative effort, shall fall within the protection scope of the present disclosure.

In view of deficiencies of the prior art, the present disclosure provides a completely new and implementable solution. In particular, the method for fingerprint authentication of the present disclosure can perform authentication based on at least a comparison result of a fingerprint image acquired in a first mode, and can also selectively perform fingerprint image acquisition and comparison of a second mode, so as to add action requirements on a target finger as needed, thereby providing a fingerprint authentication method with optional security levels.

According to the following description, it will be appreciated by those skilled in the art that, the present disclosure also provides, in a plurality of embodiments, a variety of authentication operations performed according to a level of the authentication request, e.g., presenting prompt messages for instructing the target finger to perform operations, etc., so as to meet requirements in different application scenarios. In other embodiments, by extracting static features and/or dynamic features from the fingerprint image sequence acquired in the second mode, it can be effectively identified whether the target finger is a fake finger, thereby helping to improve the accuracy and security of fingerprint authentication in the second mode. Specific implementations of the present disclosure will be described in detail below with reference to the accompanying drawings.

Figure 1:
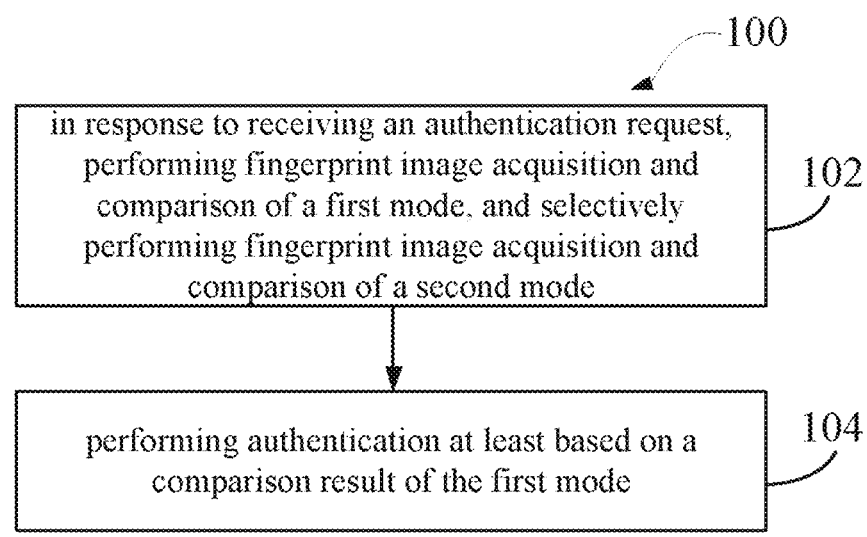
FIG. 1 schematically illustrates a flow diagram of a method for fingerprint authentication according to an embodiment of the present disclosure.

FIG. 1 schematically illustrates a flow diagram of a method for fingerprint authentication according to an embodiment of the present disclosure. As shown in FIG. 1, there is provided a method 100 for fingerprint authentication, can include: a step 102 of, in response to receiving an authentication request, performing fingerprint image acquisition and comparison of a first mode, and selectively performing fingerprint image acquisition and comparison of a second mode, wherein in the first mode, a fingerprint image generated by a pressing operation of a target finger in a fingerprint acquisition area can be acquired, and in the second mode, a fingerprint image sequence generated by a sliding operation of the target finger in the fingerprint acquisition area can be acquired.

The fingerprint image described above can be an image containing a fingerprint object, e.g. an image containing a fingerprint of the target finger. The target finger may be a real finger to which enrolled fingerprint information belongs, or it may also be a fake finger imitated for cheating an authentication system. In some application scenarios, the fingerprint acquisition area can be carried on a touch screen, so that in the step 102, the fingerprint image generated by the pressing operation of the target finger on the touch screen can be acquired, and the fingerprint image sequence generated by the sliding operation of the target finger on the touch screen can be selectively acquired. In some embodiments, the fingerprint image acquired in the first mode can include one or more images, and the comparison of the fingerprint image in the first mode can include the comparison of the acquired one or more fingerprint images.

The selective performing as described above means that it can be performed or not performed as needed. In some embodiments, fingerprint image acquisition and comparison of the first mode can be performed, and fingerprint image acquisition and comparison of the second mode can be performed. In other embodiments, only fingerprint image acquisition and comparison of the first mode can be performed. The fingerprint image sequence described above can include a plurality of images. In still other embodiments, the fingerprint image sequence can be obtained by performing continuous image acquisition operations in the process of the sliding operation described above.

Then, in step 104, authentication can be performed at least based on the comparison result of the first mode. In some embodiments, authentication can be performed based on only the comparison result of the first mode. In other embodiments, authentication can be performed based on the comparison result of the first mode and the comparison result of the second mode. For example, in an embodiment of the present disclosure, the method 100 can further include: in response to an authentication request being at a normal level, performing authentication based on the comparison result of the first mode. In another embodiment of the present disclosure, the method 100 can further include: in response to an authentication request being at a strict level, performing authentication based on the comparison results of the first mode and of the second mode.

In still another embodiment of the present disclosure, the method 100 can further include: in the first mode, comparing the fingerprint image with enrolled fingerprint information to perform fingerprint identification; and/or in the second mode, performing real/fake finger identification based on the fingerprint image sequence. In some application scenarios, the enrolled fingerprint information can include fingerprint information of users having login rights, and can be inputted and stored in advance in, for example, a fingerprint authentication system or a database, to facilitate the authentication operation. The inventors have found that, because the real finger has soft and non-planar characteristics, forces used in its sliding process may be different, which cannot ensure that its surface in contact with the fingerprint acquisition area is always the same, so that differences can be generated or changing trends can be formed between a plurality of fingerprint images in the fingerprint image sequence generated by the real finger, while it is difficult to make a fake finger with the same texture and curvature as the real finger, and thus, it is difficult to obtain, from the fingerprint image sequence generated by the fake finger, the same differences or changing trends as the real finger. Based on such a finding, the method according to the embodiment of the present disclosure can perform real/fake finger identification based on the fingerprint image sequence in the second mode.

Since the method for fingerprint authentication according to the embodiment of the present disclosure is exemplarily described above with reference to FIG. 1, it can be understood by those skilled in the art that, the above description is exemplary but not limiting, for example, in some embodiments, a plurality of fingerprint images acquired in the first mode all can be compared with the enrolled fingerprint information, and whether authentication is passed can be determined according to a proportion of images whose comparison results pass. In other embodiments, the plurality of fingerprint images acquired in the first mode can be sequentially compared with the enrolled fingerprint information; in response to the comparison of the fingerprint image currently compared being passed, the comparison of subsequent fingerprint images can be stopped. For better understanding, the following exemplary description will be made in conjunction with

FIG. 2.

Figure 2:
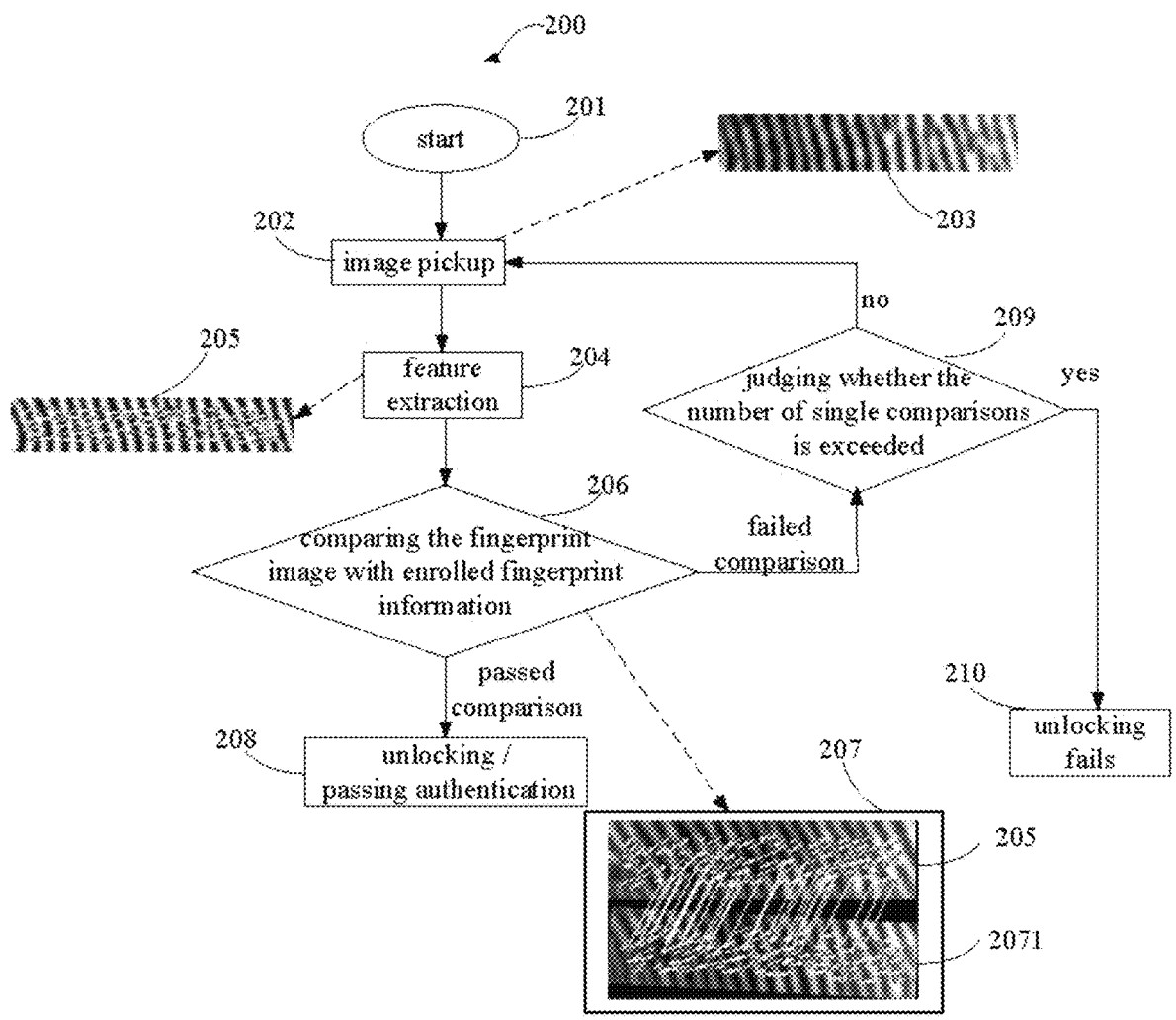
FIG. 2 schematically illustrates a flow diagram of a method of performing authentication based on a comparison result of a first mode according to an embodiment of the present disclosure.

FIG. 2 schematically illustrates a flow diagram of a method of performing authentication based on the comparison result of the first mode according to an embodiment of the present disclosure. As shown in FIG. 2, the method 200 can include: a step 201 of, in response to receiving an authentication request, starting a fingerprint authentication flow; and a step 202 of, performing fingerprint image acquisition (or image pickup) operation in the first mode, and acquiring one or more fingerprint images as needed, for example, acquiring a fingerprint image (pointed by a dotted arrow) as shown in graph 203. In some embodiments, an instantaneous and clear fingerprint image can be acquired by controlling single-image pickup time. For example, in other embodiments, the single-image pickup time can be 8 milliseconds (ms) to 20 ms.

Then, the flow can proceed to a step 204, and feature extraction of the fingerprint image acquired in the step 202 can be performed, for example, feature extraction can be achieved by extracting fingerprint feature points (for example, pointed by a dotted arrow as shown in graph 205) in the fingerprint image. Feature extraction can include, for example, extracting fingerprint ridge features and fingerprint valley (i.e., a region between adjacent ridges) features in the fingerprint image, etc.

As shown in FIG. 2, after the step 204 is performed, step 206 can be executed, to compare the fingerprint image with the enrolled fingerprint information for fingerprint identification. The comparison of the fingerprint image with the enrolled fingerprint information can be performed by comparing the fingerprint features extracted from the fingerprint image with fingerprint information at a corresponding position in the enrolled fingerprint information, for example, with reference to graph 207 (pointed by a dotted arrow), graph 205 is a feature extraction graph obtained in the step 204, and graph 2071 can be an enrolled fingerprint information graph. In the step 206, corresponding feature points in the feature extraction graph 205 of the fingerprint image can be compared with those in the enrolled fingerprint information graph 2071, and by counting whether the number of hit feature points or a percentage of the hit feature points is greater than a preset threshold, it is determined whether the comparison of the fingerprint image and the enrolled fingerprint information is successful. In some embodiments, the time for single-image pickup and single-image comparison can be controlled between 55 ms and 125 ms, which is beneficial to improve the comparison efficiency of a single fingerprint image.

Next, in response to a passed comparison in the step 206, an operation of unlocking or passing authentication in step 208 can be performed. In some application scenarios, the operation of unlocking or passing authentication can include a unlocking operation of the touch screen or an operation of passing user identity authentication, and the like.

As further shown in FIG. 2, in response to a failed comparison in the step 206, step 209 can be performed, to judge whether the number of current comparisons exceeds the number of single comparisons. The number of single comparisons can be the number of fingerprint images that are allowed to be compared in a single task (i.e., a single authentication request), and can be set as needed. Increasing the number of single comparisons is beneficial to increase the hit probability, but too many single comparisons may affect an overall comparison speed and authentication efficiency in the first mode. In some embodiments, the number of single comparisons can be set to be 1 to 5, which can increase the hit probability while ensuring the overall comparison speed and authentication efficiency in the first mode, so as to reduce a misjudgment ratio.

In some application scenarios, the number of single comparisons is set to be 5, and when the comparison of a first fingerprint image acquired in the step 202 fails in the step 206, it can be judged in step 209 whether the number of single comparisons is exceeded. Since the number of fingerprint images for comparison in the step 206 has not reached 5, it can be determined in the step 209 that the number of single comparisons is not exceeded, and the image pickup operation in the step 202 can be continued; when in a single task, it is judged in step 209 that the number of fingerprint images for comparison has reached 5, step 210 can be performed, i.e., unlocking or authentication fails.

Since the authentication method based on the first mode according to the embodiment of the present disclosure is exemplarily described above with reference to FIG. 2, it can be understood by those skilled in the art that the above description and illustration in the drawings are exemplary but not limiting, for example, the number of single comparisons may not be limited to be 5 or less, and can be set more as needed. For example, when the comparison time required for a single fingerprint image is shorter, the number of single comparisons can be increased without affecting the authentication efficiency. For another example, in other embodiments, before performing fingerprint image acquisition and comparison of the first mode, the method 200 can further include presenting a prompt message for instructing a target finger to perform at least a pressing operation. The prompt message for performing at least a pressing operation can include a prompt message for performing only the pressing operation, or can include a prompt message for performing the pressing operation and other operations. For example, in still other embodiments, the prompt message for performing at least a pressing operation can include a prompt message for performing both the pressing operation and a sliding operation. The following exemplary description will be made in conjunction with FIGS. 3 to 5.

Figure 3:
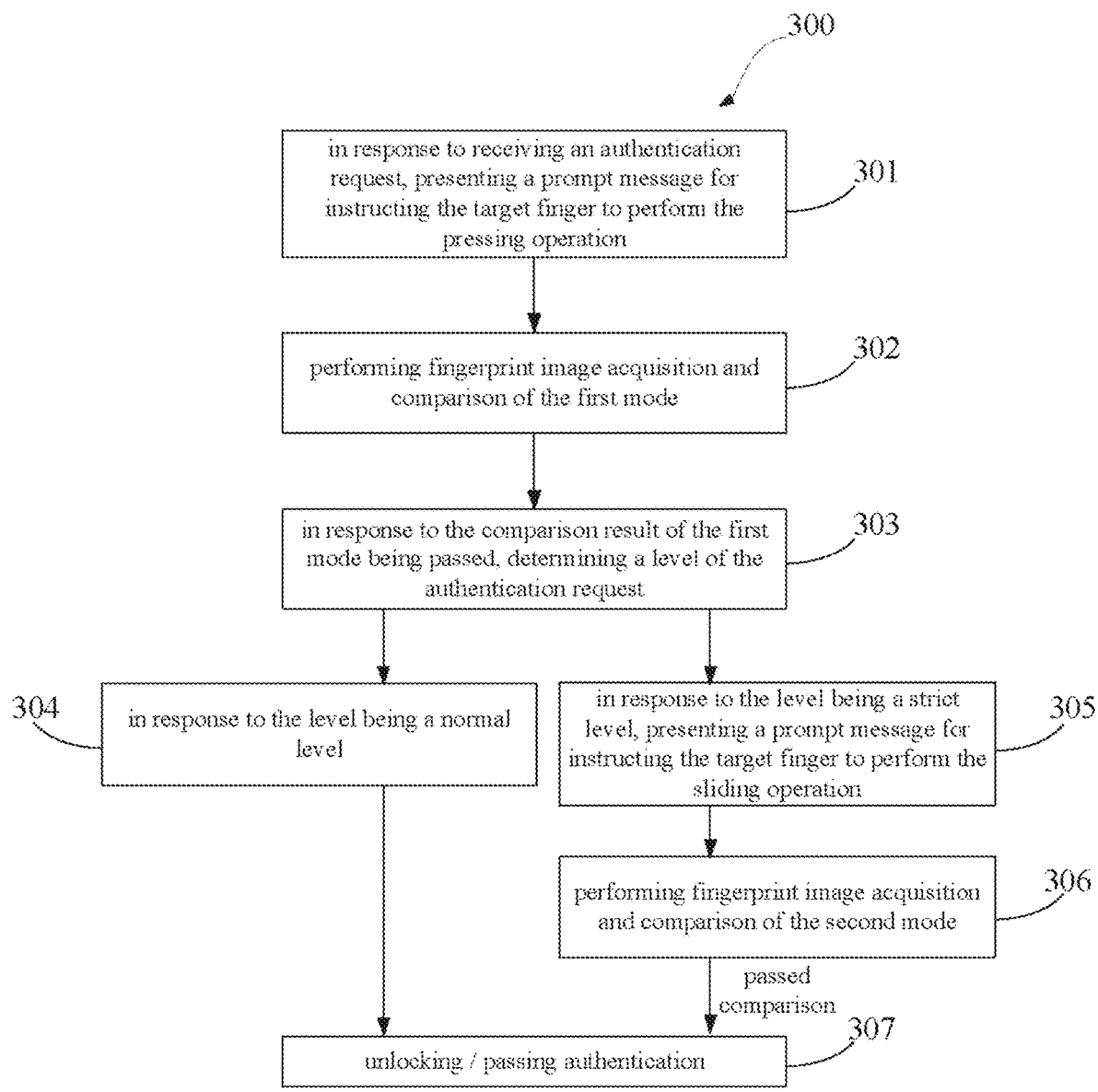
FIG. 3 schematically illustrates a flow diagram of a method for fingerprint authentication with leveled responses according to an embodiment of the present disclosure.

FIG. 3 schematically illustrates a flow diagram of a method for fingerprint authentication with leveled responses according to an embodiment of the present disclosure. Those skilled in the art will appreciate from the following description that, the method 300 shown in FIG. 3 is a specific embodiment of the method 100 shown above with reference to FIG. 1, and thus, the description above with respect to FIG. 1 is also applicable to the description below with respect to FIG. 3.

As shown in FIG. 3, the method 300 can include: a step 301 of, in response to receiving an authentication request, presenting a prompt message for instructing a target finger to perform a pressing operation. The prompt message for performing the pressing operation can be presented in a visual or audible form, for example, one or more forms of animation, picture, text, voice, video, indicator light, vibration, etc.

Next, in step 302, fingerprint image acquisition and comparison of the first mode can be performed. The fingerprint image acquisition and comparison of the first mode has been described above in detail with reference to FIGS. 1 and 2, which will not be repeated herein. In some embodiments, in response to a failed comparison result of the first mode, the flow can return to the step 301 to wait for receiving a next authentication request. In other embodiments, in response to a failed comparison result of the first mode, subsequent steps can be stopped, and a prompt message for prompting failed authentication or failed unlocking can be issued.

In still other embodiments, the flow can proceed to step 303, in which in response to the comparison result of the first mode being passed, a level of the authentication request can be determined. In some embodiments, the level of the authentication request can be acquired from the received authentication request. In other embodiments, in response to the authentication request not including information related to a level, the level can be determined according to a preset default level. Then, according to the determined level, step 304 or step 305 can be selected to be performed. As shown in FIG. 3, in the step 304, in response to the authentication request being at a normal level, step 307 can be directly performed, in which an operation of unlocking or passing authentication can be performed. In some application scenarios, the normal level is applicable to authentication requirements such as screen unlocking, etc. The step 307 is the same as or similar to the step 208 described above in conjunction with FIG. 2, which is not be repeated herein.

As further shown in FIG. 3, in step 305, in response to the level being a strict level, a prompt message for instructing the target finger to perform a sliding operation can be presented. The prompt message for performing the sliding operation can be presented in a visual or audible form, for example, one or more forms of animation, picture, text, voice, video, indicator light, vibration, etc. In some application scenarios, the strict level is applicable to scenarios such as financial operations, mobile payments, etc., where a high security level is required.

Then, the flow can proceed to step 306, in which fingerprint image acquisition and comparison of the second mode can be performed. In the second mode, a fingerprint image sequence generated by the sliding operation of the target finger in the fingerprint acquisition area can be acquired, and real/fake finger identification can be performed based on the fingerprint image sequence. According to such a setting, not only the fingerprint identification of the first mode but also the real/fake finger identification of the second mode are required, which is beneficial to improve the accuracy of fingerprint authentication, and can effectively improve the security and reliability of fingerprint authentication at the strict level.

In some embodiments, in response to a failed comparison of the fingerprint image of the second mode performed in the step 306, the flow can return to the step 301 to wait for receiving a next authentication request. In other embodiments, in response to a failed comparison result of the second mode performed in the step 306, a prompt message for prompting failed authentication or failed unlocking can be issued. In still other embodiments, in response to a passed comparison of the fingerprint image of the second mode performed in the step 306, an operation of unlocking or passing authentication in the step 307 can be performed.

The method for fingerprint authentication with leveled responses according to the embodiment of the present disclosure is exemplarily described above with reference to FIG. 3. However, it can be understood that, with respect to the embodiment shown in FIG. 3, it can be determined that the authentication fails when the comparison of the first mode fails, without performing subsequent steps of determining the level, etc., which is beneficial to quickly exclude those fingerprint image that are significantly not matched with the enrolled fingerprint information in a preliminary stage of the fingerprint authentication, so as to improve the authentication speed and authentication efficiency in some application scenarios. It will also be appreciated by those skilled in the art that, the above description in conjunction with FIG. 3 is exemplary but not limiting, for example, the step 303 of determining the authentication request level is not limited to be performed after the step 302, and in other embodiments, the step of determining the authentication request level can also be performed before the step 302. The detailed description will be made below in conjunction with FIGS. 4 and 5.

Figure 4:
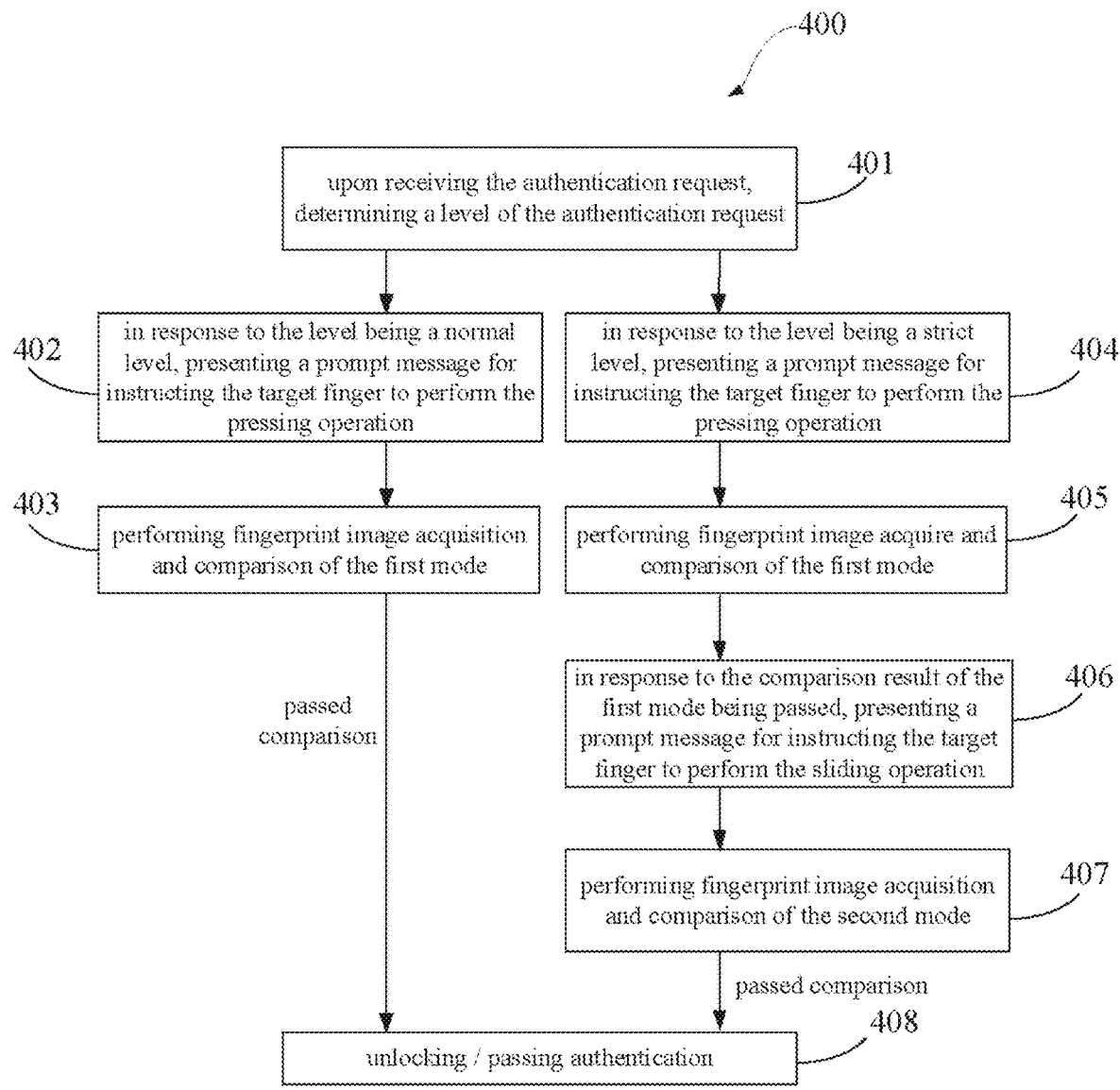
FIG. 4 schematically illustrates a flow diagram of a method for fingerprint authentication with leveled responses according to another embodiment of the present disclosure.

FIG. 4 schematically illustrates a flow diagram of a method for fingerprint authentication with leveled responses according to another embodiment of the present disclosure. As shown in FIG. 4, the method 400 can include: a step 401 of, upon receiving the authentication request, determining a level of the authentication request. The implementation of determining the level of the authentication request can be the same as or similar to that described above in conjunction with the step 303 in FIG. 3, which is not be repeated herein. Next, step 402 or step 404 can be selectively performed according to the determined level.

As shown in FIG. 4, in the step 402, in response to the level being a normal level, a prompt message for instructing the target finger to perform a pressing operation can be presented. Next, in response to the pressing operation of the target finger in a fingerprint acquisition area, step 403 can be performed, i.e., performing fingerprint image acquisition and comparison of the first mode. In some embodiments, in response to a failed comparison of the fingerprint image of the first mode performed in the step 403, an operation of returning to the step 401 can be performed to wait for receiving a next authentication request. In other embodiments, in response to a failed comparison result of the first mode performed in the step 403, a prompt message for prompting failed authentication or failed unlocking can be issued. In still other embodiments, in response to a passed comparison of the fingerprint image of the first mode performed in the step 403, step 408 can be performed to perform an operation of unlocking or passing authentication.

As further shown in FIG. 4, in the step 404, in response to the level being a strict level, a prompt message for instructing the target finger to perform the pressing operation can be presented. Next, in response to the pressing operation of the target finger in the fingerprint acquisition area, step 405 can be performed, i.e., performing fingerprint image acquisition and comparison of the first mode. In some embodiments, in response to a failed comparison of the fingerprint image of the first mode performed in the step 405, an operation of returning to the step 401 can be performed to wait for receiving a next authentication request. In other embodiments, in response to a failed comparison result of the first mode performed in the step 405, a prompt message for prompting failed authentication or failed unlocking can be issued.

In still other embodiments, in step 406, in response to a passed comparison result of the first mode, a prompt message for instructing the target finger to perform a sliding operation can be presented. Next, in response to the sliding operation of the target finger in the fingerprint acquisition area, step 407 can be performed, i.e., performing fingerprint image acquisition and comparison of a second mode. In some embodiments, a fingerprint image sequence generated by the sliding operation of the target finger can be acquired, and real/fake finger identification can be performed based on the acquired fingerprint image sequence.

Next, in response to the comparison result of the fingerprint image of the second mode in the step 407 being passed, step 408 can be performed to perform an operation of unlocking or passing authentication. In other embodiments, in response to the comparison result of the fingerprint image of the second mode in the step 407 being failed, an operation of returning to the step 401 can be performed to wait for receiving a next authentication request. In still other embodiments, in response to the comparison result of the second mode in the step 407 being failed, a prompt message for prompting failed authentication or failed unlocking can be issued.

Since the method for fingerprint authentication according to another embodiment of the present disclosure is exemplarily described above with reference to FIG. 4, it can be understood that, the above description and the illustration in FIG. 4 are exemplary but not limiting, and those skilled in the art can make adjustments as needed, for example, in the step 404, after in response to the level of the authentication request being a strict level, it cannot be limited to present the prompt message for instructing the target finger to perform the pressing operation, and in other embodiments, a prompt message for instructing the target finger to press-first-then-slide can be presented. For better understanding, the following exemplary description will be made in conjunction with FIG. 5.

Figure 5:
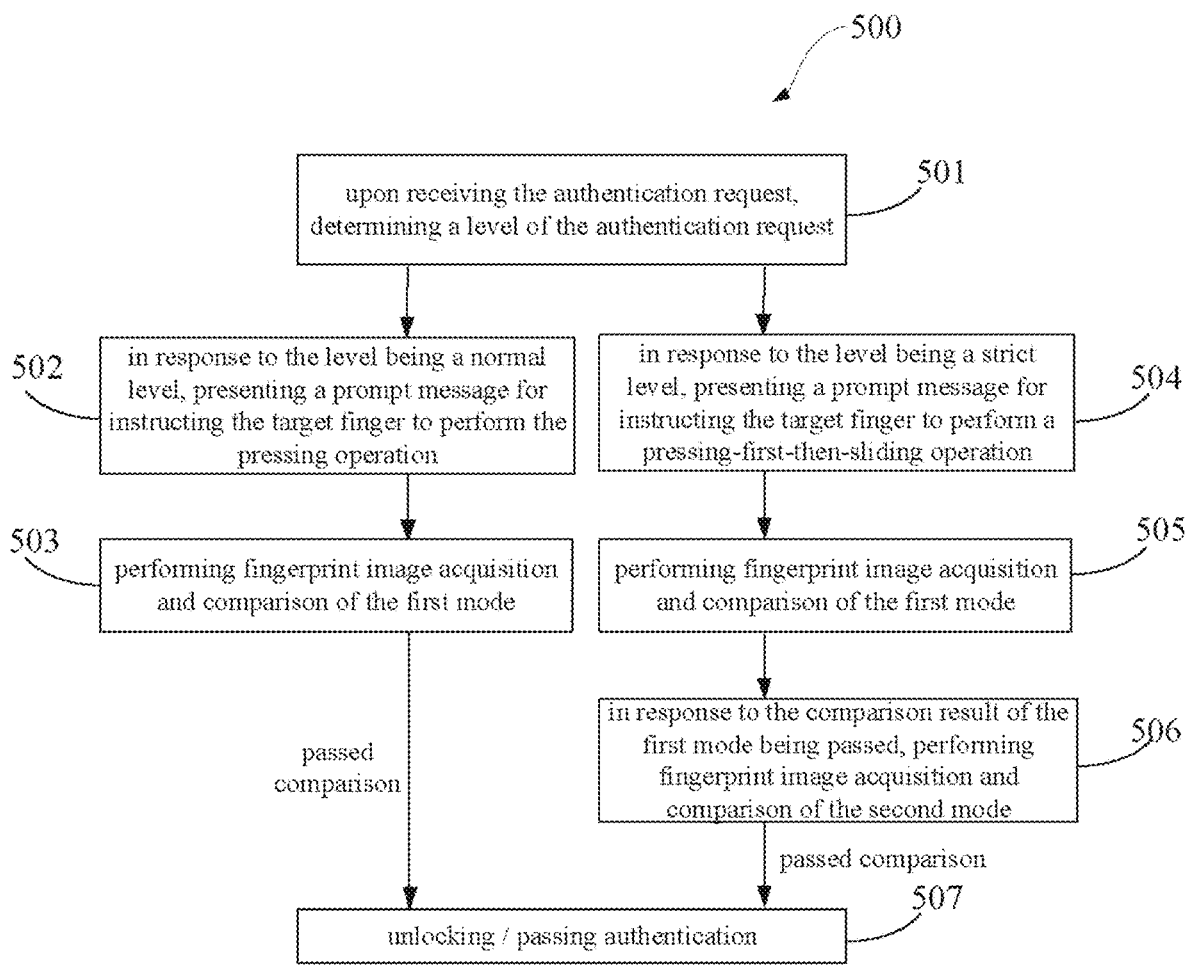
FIG. 5 schematically illustrates a flow diagram of a method for fingerprint authentication with leveled responses according to still another embodiment of the present disclosure.

FIG. 5 schematically illustrates a flow diagram of a method for fingerprint authentication with leveled responses according to still another embodiment of the present disclosure. As shown in FIG. 5, the method 500 can include, in step 501, upon receiving the authentication request, determining a level of the authentication request. Then, step 502 or step 504 can be selectively performed according to the determined level. In the step 502, in response to the level being a normal level, a prompt message for instructing a target finger to perform a pressing operation can be presented. Then, the flow can proceed to step 503, in which fingerprint image acquisition and comparison of a first mode can be performed. In some embodiments, in response to the comparison result of the first mode in the step 503 being passed, an operation of unlocking or passing authentication in step 507 can be performed. The step 501, step 502, step 503 and step 507 shown in FIG. 5 are the same as or similar to the step 401, step 402, step 403 and step 407 described above in conjunction with FIG. 4, respectively, which is not be repeated herein. The operations performed in response to the level being a strict level will be described in detail below.

As further shown in FIG. 5, in step 504, in response to the level being a strict level, a prompt message for instructing the target finger to perform a pressing-first-then-sliding operation can be presented. The prompt message for the pressing-first-then-sliding operation can be presented in a visual or audible form, for example, one or more forms of animation, picture, text, voice, video, indicator light, etc. Then, in response to the pressing-first-then-sliding operation of the target finger in a fingerprint acquisition area, step 505 can be performed, i.e., performing fingerprint image acquisition and comparison of the first mode. In some embodiments, in response to the comparison result of the fingerprint image of the first mode in the step 505 being failed, an operation of returning to the step 501 can be performed to wait for receiving a next authentication request. In other embodiments, in response to the comparison result of the first mode in the step 505 being failed, a prompt message for prompting failed authentication or failed unlocking can be issued.

Further, as shown in FIG. 5, in step 506, in response to the comparison result of the first mode performed in the step 505 being passed, fingerprint image acquisition and comparison of a second mode can be performed. In response to the comparison result of the fingerprint image of the second mode in the step 506 being passed, an operation of unlocking or passing authentication in the step 507 can be performed. In some embodiments, in response to the comparison result of the fingerprint image of the second mode in the step 506 being failed, an operation of returning to the step 501 can be performed to wait for receiving a next authentication request. In other embodiments, in response to the comparison result of the second mode in the step 506 being failed, a prompt message for prompting failed authentication or failed unlocking can be issued.

Since the method for fingerprint authentication with leveled responses according to still another embodiment of the present disclosure is described in detail above with reference to FIG. 5. However, it should be understood that, according to the step 504 in this embodiment, after in response to the level being a strict level, the prompt message for instructing the target finger to perform the pressing-first-then-sliding operation is presented, so that the target finger can be lifted after completing all actions at one time, which is beneficial to reduce the number of user operations at the strict level, and thus, is beneficial to improve user experience. It will also be appreciated by those skilled in the art that, the above description is exemplary but not limiting, for example, fingerprint image acquisition of the second mode performed in the step 506 is not limited to be performed after the step 505 shown in the figure. In other embodiments, acquisition of the fingerprint image sequence of the second mode can be performed before the fingerprint image comparison of the first mode is performed, that is, fingerprint image acquisition of the first mode and fingerprint image sequence acquisition of the second mode can be achieved in the pressing and sliding process of the target finger, without waiting for the comparison result of the first mode. For another example, in still other embodiments, in response to the level being a strict level, a prompt message for instructing the target finger to perform a sliding-first-then-pressing operation can be presented.

The method for fingerprint authentication according to a plurality of embodiments of the present disclosure is described in detail above with reference to FIGS. 3 to 5, but different implementations can be selected by those skilled in the art according to application requirements. In order to better understand the fingerprint image acquisition and comparison process of the second mode, a detailed implementation for performing the fingerprint image acquisition and comparison of the second mode will be described below with reference to FIG. 6.

Figure 6:
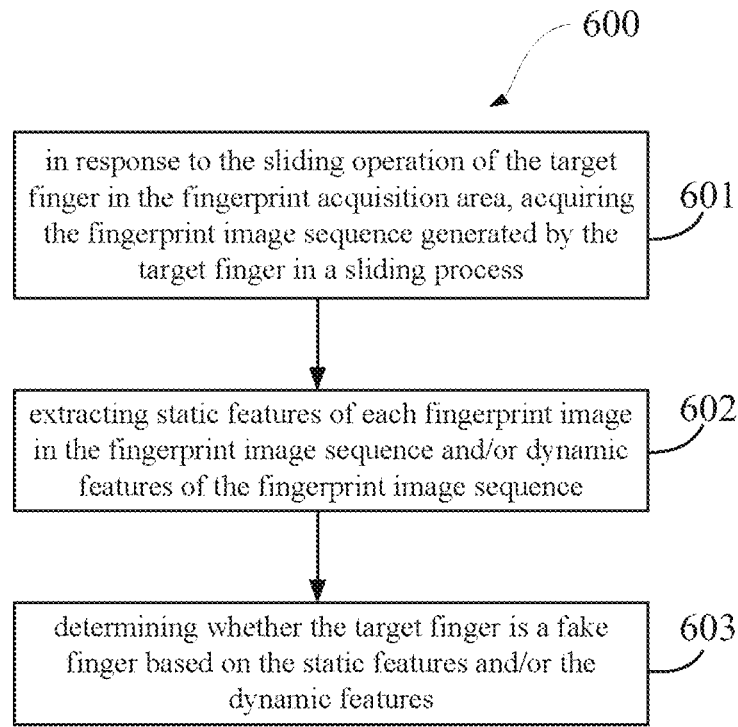
FIG. 6 schematically illustrates a flow diagram of a method of performing fingerprint image acquisition and comparison of a second mode according to an embodiment of the present disclosure.

FIG. 6 schematically illustrates a flow diagram of a method of performing fingerprint image acquisition and comparison of a second mode according to an embodiment of the present disclosure. As shown in FIG. 6, the method 600 can include: a step 601 of, in response to a sliding operation of a target finger in a fingerprint acquisition area, a fingerprint image sequence generated by the target finger in a sliding process can be acquired. In some application scenarios, in response to a pressing-first-then-sliding operation of the target finger in the fingerprint acquisition area, the fingerprint image generated by the target finger in the pressing process can be acquired for the comparison of the first mode, and the fingerprint image sequence generated by the target finger in the sliding process can be acquired for the comparison of the second mode.

In some embodiments, by controlling the acquisition time of the fingerprint image sequence, the number of fingerprint images in the obtained fingerprint image sequence can be controlled. The longer the image acquisition time is, the more fingerprint images will be obtained, which is beneficial to improve the comparison accuracy in the second mode. However, the more the fingerprint images are obtained, the greater the amount of data that needs to be processed is, which may affect the comparison speed and efficiency in the second mode. In other embodiments, in the sliding process of the target finger, image pickup time (or image acquisition time) can be controlled to be 0.5 second (s) to 1.5 s, for example, 4 to 28 fingerprint images can be continuously acquired, and such image pickup time and the number of images picked up can meet the comparison accuracy requirement of the second mode, and can also ensure the comparison rate and efficiency.

Next, in step 602, static features of each fingerprint image in the fingerprint image sequence and/or dynamic features of the fingerprint image sequence can be extracted. In order to facilitate understanding of a process of extracting the static features and/or the dynamic features, the following exemplary description will be made with reference to FIG. 7.

Figure 7:
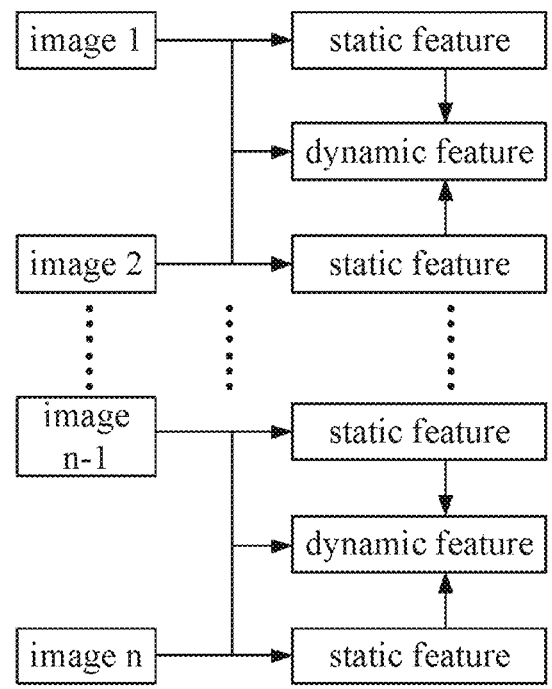
FIG. 7 schematically illustrates a schematic diagram of a process of extracting static features and dynamic features according to an embodiment of the present disclosure.

FIG. 7 schematically illustrates a schematic diagram of a process of extracting static features and dynamic features according to an embodiment of the present disclosure. As shown in FIG. 7, static features can be directly extracted from each image picked up, and dynamic features can be extracted from two adjacent images picked up to obtain dynamically changing features between the two adjacent images picked up. In some embodiments, dynamic features can be obtained from the static features extracted from the two adjacent images picked up. In addition, it should be noted that, the picked-up image 1 to image n as shown in FIG. 7 constitute a fingerprint image sequence, wherein the image 1 can represent a first fingerprint image acquired in the sliding process of the target finger, the image 2 can represent a second fingerprint image acquired in the sliding process of the target finger, and so on, the image n can represent an nth fingerprint image acquired in the sliding process of the target finger, and n represents a positive integer.

In view of the above description in conjunction with FIG. 7, it will be understood that, the static features can be obtained directly from each fingerprint image of the fingerprint image sequence and dynamic features can be obtained from a plurality of fingerprint images in the fingerprint image sequence. It will also be appreciated by those skilled in the art that, the extraction process shown in FIG. 7 is exemplary but not limiting, for example, the extraction of the dynamic features is not limited to extraction between two adjacent fingerprint images, and the dynamic features can be extracted from more fingerprint images, to obtain a dynamic changing trend among the plurality of fingerprint images. For another example, in some application scenarios, it is not limited that both static features and dynamic features are extracted, and only the static features or dynamic features of the fingerprint image sequence can be extracted as needed.

After the process of extracting the static features and/or the dynamic features is described in conjunction with FIG. 7, the following description will return to FIG. 6. As shown in FIG. 6, in step 602, the static features and/or dynamic features in the fingerprint image sequence can be extracted, and in an embodiment of the present disclosure, extracting the static features can include at least one of: generating global gray level distributions of the fingerprint images; generating local gray level distributions of the fingerprint images; and extracting burr features of ridges in the fingerprint images. The gray level distribution can be a distribution of gray levels of a gray level image, and the gray level can generally be in a numerical range of 0 to 255, wherein the gray level 255 represents white and the gray level 0 represents black. That generating global gray level distributions of the fingerprint images can include generating a whole (or overall) gray level distribution of each fingerprint image. The local gray level distribution can include a gray level distribution of a partial area in each fingerprint image. The burr features of ridges can include fuzzy ridge boundaries. Fingerprint ridges can be lines formed by raised skin on a finger pulp.

In another embodiment of the present disclosure, that extracting the dynamic features can include at least one of: counting the number of fingerprint images containing partial non-fingerprint areas in the fingerprint image sequence; counting the number of fingerprint images without fingerprint information in the fingerprint image sequence; counting a signal intensity difference between previous and later fingerprint images in the fingerprint image sequence; and determining a continuous matching hit state of the fingerprint image sequence. A fingerprint image containing a partial non-fingerprint area can refer to a fingerprint image containing a partial fingerprint area and a partial non-fingerprint area. In some embodiments, a fingerprint image without fingerprint information can include an image without any information related to fingerprint, such as a blank image.

In still another embodiment of the present disclosure, that counting a signal intensity difference between previous and later fingerprint images in the fingerprint image sequence can include: calculating standard deviations or standard deviation means of signal intensity distributions of fingerprint images in the fingerprint image sequence within previous and later different time periods; and comparing a difference between the standard deviations or the standard deviation means to obtain the signal intensity difference. Fingerprint images within previous and later different time periods can include one or more fingerprint images. The number of fingerprint images within previous and later different time periods can be the same or different. For example, in some embodiments, one fingerprint image can be included within a previous one of the previous and later different time periods, and a plurality of fingerprint images can be included within a later one of the previous and later different time periods. In other embodiments, a plurality of fingerprint images can be included within the previous one of the previous and later different time periods, and one fingerprint image can be included within the later one of the previous and later different time periods. In still other embodiments, in the fingerprint image sequence, one fingerprint image can be included within a previous time period, and one fingerprint image can be included within a later time period. In still other embodiments, in the fingerprint image sequence, a plurality of fingerprint images can be included within a previous time period, and a plurality of fingerprint images can be included within a later time period.

According to an embodiment of the present disclosure, the signal intensity distribution of the fingerprint image can be obtained from, for example, a gray level distribution of the fingerprint image. According to another embodiment of the present disclosure, a signal intensity difference of the fingerprint images can be obtained from a difference of fingerprint spectrums. Fingerprint saturation of a real finger is usually clear, and a high-frequency effect in the fingerprint spectrum of the real finger is stronger; while a fingerprint of a fake finger is slightly turbid, and a high-frequency effect in the fingerprint spectrum of the fake finger is lower. In some embodiments, spectral analysis effect can be achieved through the disassembly of some spectral tools (e.g., Fourier transform, wavelet transform, etc.). In still another embodiment of the present disclosure, the signal intensity difference of the fingerprint images can be acquired from an intensity difference of fingerprint edges. An intensity of the fingerprint edge can be obtained by performing high pass filter by, for example, a Sobel operator, a Scharr operator, etc., and since the fingerprint edge of the real finger is sharper than that of the fake finger, it is reliable to judge truth of the fingerprint through the intensity of the fingerprint edge.

In another embodiment of the present disclosure, that determining a continuous matching hit state of the fingerprint image sequence can include: matching each fingerprint image in the fingerprint image sequence with the enrolled fingerprint information to generate a matching result; in response to the matching result conforming to a first pattern, determining that the fingerprint image sequence is in a continuous matching hit state; and in response to the matching result conforming to a second pattern, determining that the fingerprint image sequence is in a non-continuous matching hit state. In some embodiments, the first pattern can include: after the matching of any of fingerprint images in the fingerprint image sequence hits, the matching of subsequent fingerprint images continuously hits, until a fingerprint image without matching hit appears or the target finger is detected to leave the fingerprint acquisition area, and the matching of none of fingerprint images subsequent to this fingerprint image without matching hit, hits. In other embodiments, the second pattern can include, for example the following situation: the matching of a fingerprint image in the fingerprint image sequence hits first, then not hit, and then hits. For better understanding, the first pattern and the second pattern will be exemplified below.

In still other embodiments, the matching hit of the fingerprint image with the enrolled fingerprint information can be set to 1, and the failed matching of the fingerprint image with the enrolled fingerprint information can be set to 0, then the first pattern can include, for example, at least one of 0011111111100, 011111111111, 11111111111000, 11111111111, etc.; and the second pattern can include, for example, at least one of 0011100111000, 1111110011111, 100111111000, 00011111011111, etc. It should be noted that, the number of 1 and 0 in this embodiment is exemplary and can be changed according to practical applications, and a sum of the number of 1 and 0 can correspond to the number of the fingerprint images included in the fingerprint image sequence.

As further shown in FIG. 6, the flow can proceed to step 603, in which it can be determined whether the target finger is a fake finger based on the static features and/or the dynamic features. In some embodiments, it can be determined whether the target finger is a fake finger based on only the static features. In other embodiments, it can be determined whether the target finger is a fake finger based on only the dynamic features. In still other embodiments, it can be determined whether the target finger is a fake finger based on both the static features and the dynamic features. In still other embodiments, in response to determining that the target finger is a fake finger, it can be determined that the comparison in the second mode fails.

In another embodiment of the present disclosure, that determining whether the target finger is a fake finger based on the static features and/or the dynamic features can comprise: based on the static features and/or the dynamic features, judging whether the target finger is a fake finger using a machine model trained in advance or according to a preset logic. In some embodiments, the machine model can include a model based on a deep neural network, and the judgment of a fake finger can be achieved by training the judgment of the static features and dynamic features by the machine model in advance and utilizing the self-learning capability of the machine model.

In still another embodiment of the present disclosure, the preset logic can include determining the finger as a fake finger when at least one of the following is satisfied: a percentage of the number of fingerprint images in the fingerprint image sequence which are confirmed to belong to a fake finger based on the static features exceeding a first threshold; the number of fingerprint images containing partial non-fingerprint areas in the fingerprint image sequence being less than a second threshold; the number of fingerprint images without fingerprint information in the fingerprint image sequence being greater than a third threshold; a signal intensity difference between previous and later fingerprint images in the fingerprint image sequence being less than a fourth threshold; and the fingerprint image sequence being in a non-continuous matching hit state.

In some embodiments, that determining the finger as a fake finger when at least one of the following is satisfied can include: determining the finger as a fake finger when all of the above five conditions are satisfied. Based on such a setting, the condition required to be satisfied for determining the finger as a fake finger is more strict, so that it is more cautious to determine the finger as a fake finger, which is beneficial to reduce the misjudgment ratio of confirming a fake finger to a greater extent.

In other embodiments, the preset logic can further include selecting one or more of the above five conditions to perform the judgment. In still other embodiments, the preset logic can include selecting at least two of the above five conditions to perform the judgment as to a fake finger.

In some embodiments, the preset logic can include performing the judgment on the above five conditions in a preset judgment order. For example, in other embodiments, when the judgment on the five conditions are sequentially performed in a preset judgment order, in response to a current condition being satisfied, the judgment on the other conditions ranked after the current condition can be stopped, and the target finger can be directly determined as a fake finger.

In an embodiment of the present disclosure, that based on the static features, confirming the finger as a fake finger can include: according to the static features of each fingerprint image, detecting whether each fingerprint image has fake finger features; and in response to detecting the fake finger features, confirming that the fingerprint image belongs to a fake finger. That is, in response to detecting the fake finger features, it can be confirmed that the fingerprint image having the detected fake finger features belongs to a fake finger. In another embodiment of the present disclosure, the fake finger features can include at least one of: a distribution range of a global gray level distribution of the fingerprint image being less than a fifth threshold; a distribution range of a local gray level distribution of the fingerprint image being less than a sixth threshold; and ridges in the fingerprint image having burr features. The burr features can be embodied as indistinct black-and-white boundaries of fingerprint lines shown in the fingerprint image, fuzzy boundaries between fingerprint ridges and valleys, etc. The burr features can be judged by means of image analysis, gray level distribution analysis, and the like.

By confirming whether each fingerprint image in the fingerprint image sequence belongs to a fake finger, the number of fingerprint images confirmed to belong to a fake finger in the fingerprint image sequence can be counted, and by calculating a ratio of the number of these fingerprint images to the total number of fingerprint images in the fingerprint image sequence, a percentage of the number of the fingerprint images confirmed to belong to a fake finger in the fingerprint image sequence based on the static features can be obtained. In some embodiments, the first threshold can be 70%.

The method for fingerprint image acquisition and comparison in the second mode according to the embodiment of the present disclosure is described in detail above in conjunction with FIGS. 6 and 7. However, it can be understood by those skilled in the art that, the above description is exemplary but not limiting, for example, fingerprint image acquisition and comparison of the second mode may not be limited to the steps shown in the figures, and can be adjusted as needed. In other embodiments, the method 600 can further include: detecting whether the target finger leaves the fingerprint acquisition area; in response to detecting that the target finger has left the fingerprint acquisition area, stopping the fingerprint image acquisition, and judging a fake finger based on at least one of the static features and dynamic features of the fingerprint image sequence; and in response to detecting that the target finger has not left the fingerprint acquisition area, continuing the acquisition of the fingerprint image and extraction of the static features and/or dynamic features. Furthermore, in order to easily understand differences in the static features and/or dynamic features between a real finger and a fake finger, and to further verify the accuracy and reliability of the method for the fingerprint image comparison in the second mode according to the embodiment of the present disclosure, the following will be exemplarily shown and described in conjunction with FIGS. 8 to 19.

Figure 8:
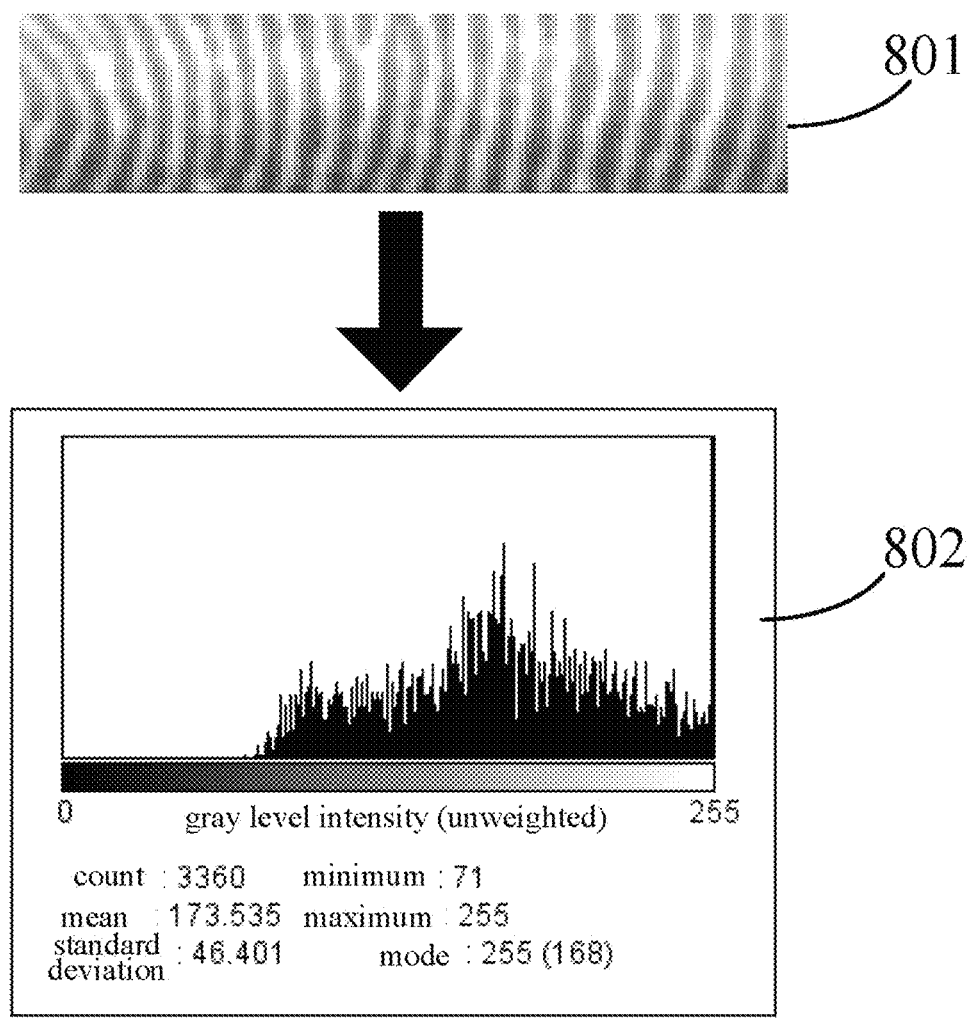
FIG. 8 schematically illustrates a schematic diagram of a global gray level distribution of fingerprint images of a real finger according to an embodiment of the present disclosure.

FIG. 8 schematically illustrates a schematic diagram of a global gray level distribution of a fingerprint image of a real finger according to an embodiment of the present disclosure. As shown in FIG. 8, fingerprint lines presented in the fingerprint image 801 of the real finger are deeper, and boundaries between ridges and valleys are clear. As shown in the figure, the gray level distribution graph 802 is a schematic diagram of the global gray level distribution of the fingerprint image 801, and as can be seen from the global gray level distribution graph 802, the global gray level of the fingerprint image 801 of the real finger has a minimal of 71 and a maximum of 255, and has a wide distribution range.

Figure 9:
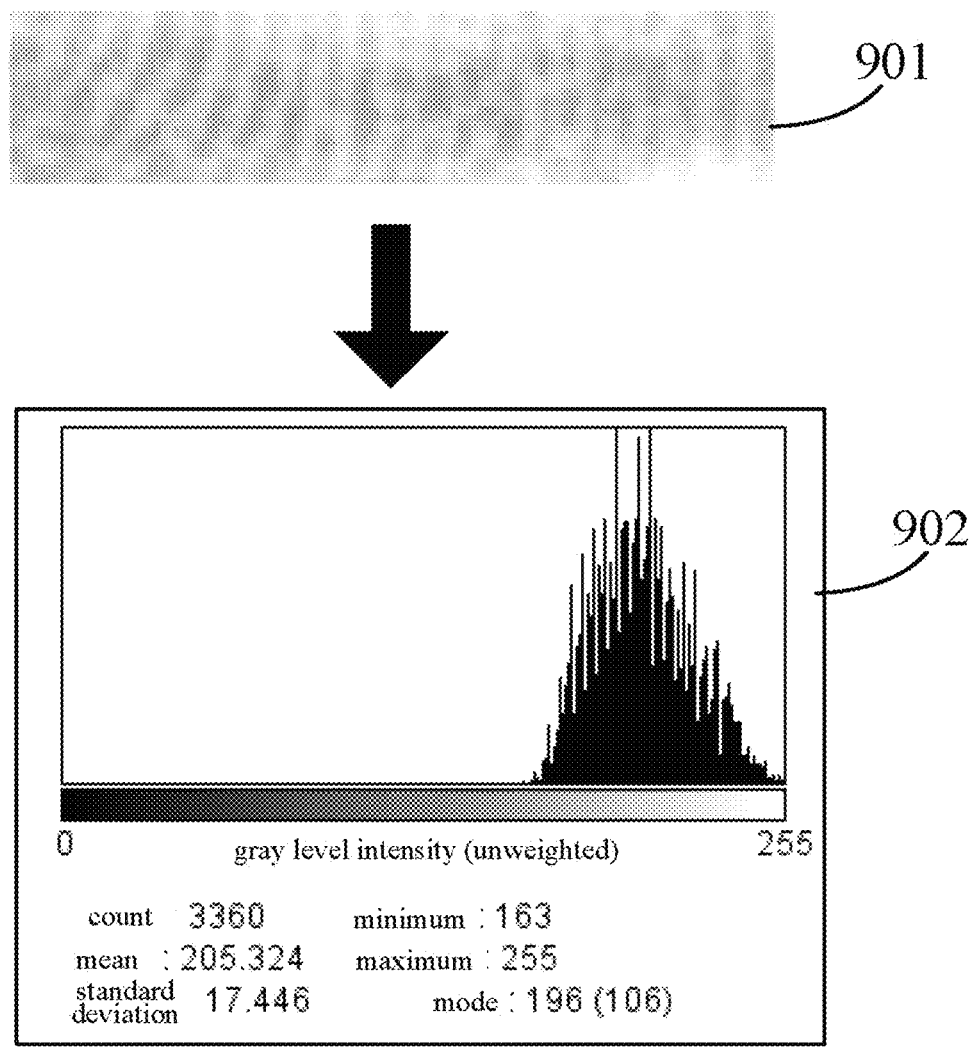
FIG. 9 schematically illustrates a schematic diagram of a global gray level distribution of fingerprint images of a fake finger according to an embodiment of the present disclosure.

FIG. 9 schematically illustrates a schematic diagram of a global gray level distribution of a fingerprint image of a fake finger according to an embodiment of the present disclosure. Compared with the fingerprint image 801 of the real finger shown in FIG. 8, fingerprint lines presented in the fingerprint image 901 of the fake finger shown in FIG. 9 is significantly shallower, and boundaries between ridges and valleys is significantly fuzzy. As further shown in FIG. 9, the gray level distribution graph 902 is a schematic diagram of the global gray level distribution of the fingerprint image 901, and as can be seen from the global gray level distribution graph 902, the global gray level of the fingerprint image 901 of the fake finger has a minimum of 163 and a maximum of 255. Compared with the global gray level distribution graph 802 shown in FIG. 8, the global gray level distribution range shown in FIG. 9 is significantly narrower. Therefore, in some embodiments, it can be judged whether the target finger is a fake finger by judging the global gray level distribution range of the fingerprint image. For example, in other embodiments, when it is detected that the distribution range of the global gray level distribution of the fingerprint image (i.e. a ratio of a region in which the gray level distribution is involved to all gray level values 0 to 255) is less than a fifth threshold, the target finger can be confirmed as a fake finger. In still other embodiments, the fifth threshold can be, for example, 50%.

The global gray level distributions of the fingerprint images of the real finger and the fake finger are compared and analyzed in conjunction with FIGS. 8 and 9 above. From the above description, it can be understood by those skilled in the art that, the global gray level distributions of the fingerprint images from the real finger and the fake finger have a significant difference, and thus, it is accurate and reliable to use the global gray level distribution range as a fake finger feature. In other embodiments, the fake finger can also be identified based on a local gray level distribution of the fingerprint image, which will be described below with reference to FIGS. 10 and 11.

Figure 10:
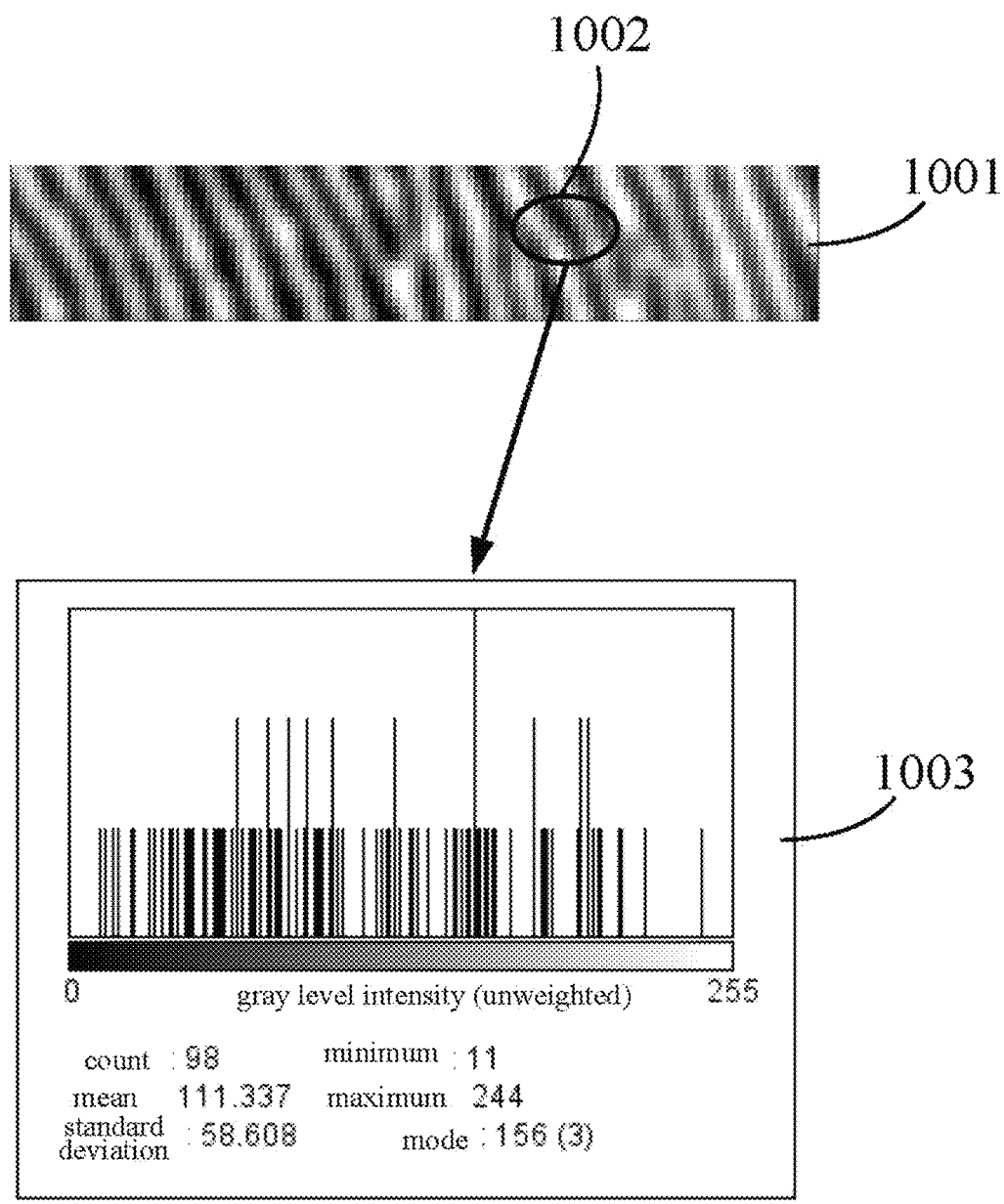
FIG. 10 schematically illustrates a schematic diagram of a local gray level distribution of fingerprint images of a real finger according to an embodiment of the present disclosure.

FIG. 10 schematically illustrates a schematic diagram of a local gray level distribution of a fingerprint image of a real finger according to an embodiment of the present disclosure. As shown in FIG. 10, the local fingerprint area 1002 (shown by a circle in the figure) in the fingerprint image 1001 from the real finger can be selected for gray level distribution analysis, and a local gray level distribution graph 1003 can be obtained. As can be seen from the local gray level distribution graph 1003, the local gray level of the fingerprint image 1001 of the real finger has a minimum of 11 and a maximum of 244, and has a wide distribution range.

Figure 11:
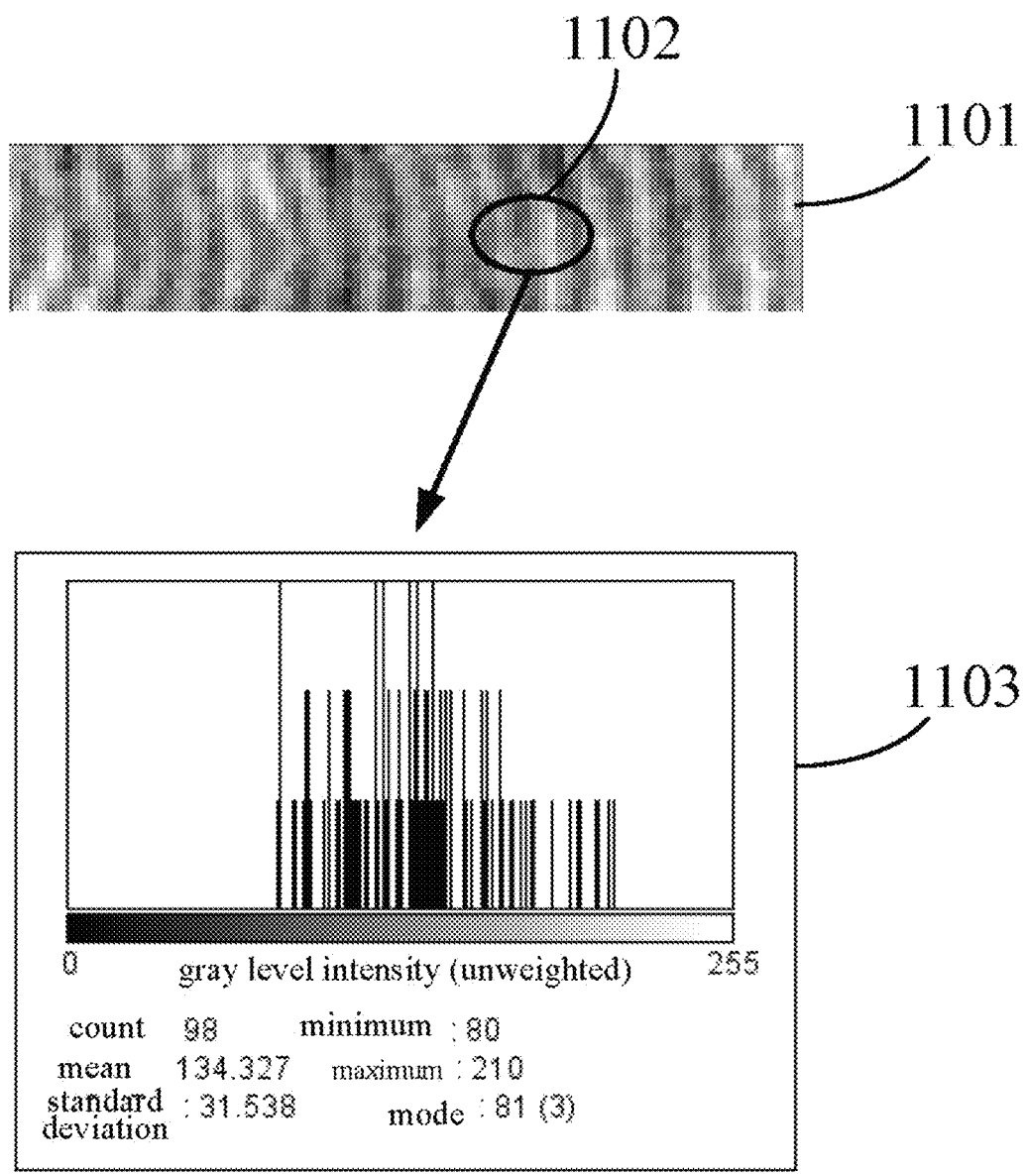
FIG. 11 schematically illustrates a schematic diagram of a local gray level distribution of fingerprint images of a fake finger according to an embodiment of the present disclosure.

FIG. 11 schematically illustrates a local gray level distribution of a fingerprint image of a fake finger according to an embodiment of the present disclosure. As shown in FIG. 11, the local fingerprint area 1102 (shown by a circle in the figure) in the fingerprint image 1101 from the fake finger can be selected for gray level distribution analysis, and a local gray level distribution graph 1103 can be obtained. As can be seen in the fingerprint image 1101, fingerprint lines presented in the local fingerprint area 1102 of the fingerprint image of the fake finger is fuzzy, and boundaries between ridges and valleys is fuzzy, which can also be called burr features of the ridges. As can be seen from the local gray level distribution graph 1103, the gray level of the local fingerprint area 1102 of the fake finger has a minimum of 80 and a maximum of 210. Compared with the local gray level distribution graph 1003 shown in FIG. 10, the local gray level distribution range shown in FIG. 11 is significantly narrower. Therefore, in some embodiments, it can be confirmed whether the target finger is a fake finger by judging the local gray level distribution range of the fingerprint image. For example, in other embodiments, when it is detected that the distribution range of the local gray level distribution of the fingerprint image is less than a sixth threshold, the target finger can be confirmed as a fake finger. In still other embodiments, the sixth threshold can be, for example, 50%.

The local gray level distributions of the fingerprint images from the real finger and the fake finger are compared and explained above in conjunction with FIGS. 10 and 11. From the above description, it can be understood by those skilled in the art that, the local gray level distribution ranges of the fingerprint images from the real finger and the fake finger have a significant difference, and thus, it is accurate and reliable to use the local gray level distribution range as a fake finger feature. In some embodiments, according to the static features of each fingerprint image in the fingerprint image sequence, it can be confirmed whether each fingerprint image has a fake finger feature, and according to a percentage of the number of fingerprint images having the fake finger feature in the fingerprint image sequence, it is determined whether the target finger is a fake finger. It will also be appreciated by those skilled in the art that, the above description is exemplary but not limiting, for example, burr features of ridges may not be limited to be detected by means of the gray level distribution, and other detection means such as image recognition techniques can be used.

The implementation of confirming the finger as a fake finger based on the static features is exemplarily described above, and an implementation of judging whether the target finger is a fake finger based on the dynamic features will be specifically described below with reference to a plurality of schematic diagrams.

Figure 12:
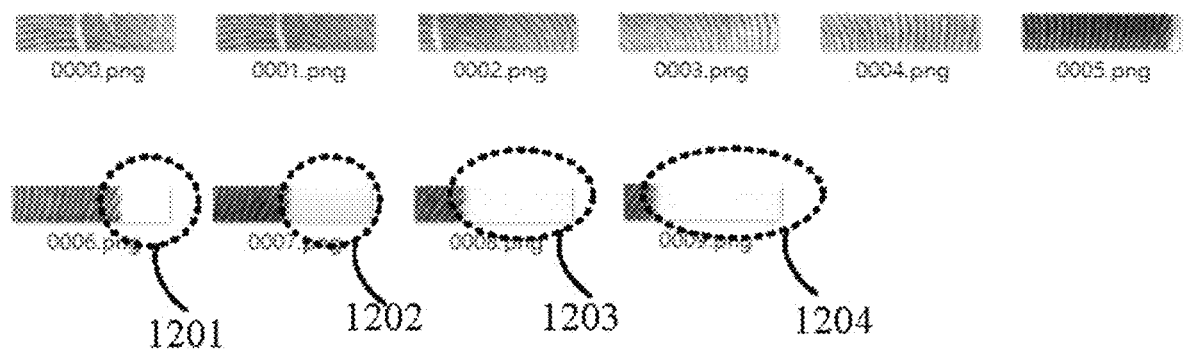
FIG. 12 schematically illustrates a schematic diagram of fingerprint images containing partial non-fingerprint areas in a fingerprint image sequence according to an embodiment of the present disclosure.

FIG. 12 schematically illustrates a schematic diagram of fingerprint images containing partial non-fingerprint areas in a fingerprint image sequence according to an embodiment of the present disclosure. As shown in FIG. 12, the fingerprint image sequence of this embodiment can include ten fingerprint images, four of which contain partial non-fingerprint areas (for example, non-fingerprint areas 1201, 1202, 1203, and 1204 shown by dotted circles in the figure), that is, the number of the fingerprint images containing partial non-fingerprint areas in the fingerprint image sequence is four.

The inventors have found that, since a contact surface of a real finger is not planar, its partial finger pulp is, in its sliding process in the fingerprint acquisition area, not liable to be contacted with the fingerprint acquisition area, and thus, it is liable to acquire the fingerprint images containing partial non-fingerprint areas. Since it is difficult for a fake finger to imitate curvature of a real finger, it is difficult to generate a fingerprint image containing a partial non-fingerprint area while the fake finger is contacted with the fingerprint acquisition area. Based on the findings of this embodiment, in some embodiments, it can be confirmed whether the target finger is a fake finger by judging the number of fingerprint images containing partial non-fingerprint areas in the fingerprint image sequence. For example, in other embodiments, the target finger can be confirmed as a fake finger when it is detected that the number of fingerprint images containing partial non-fingerprint areas in the fingerprint image sequence is less than a second threshold. In still other embodiments, the second threshold can be set to, for example, 3 or 4 or 6 or 8.

Figure 13:
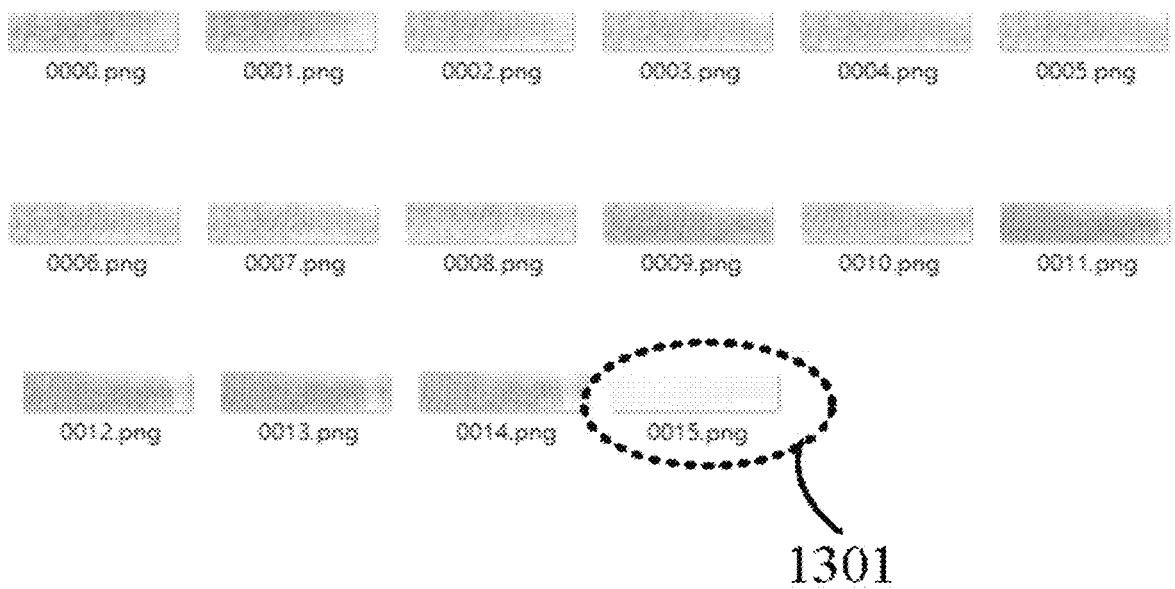
FIG. 13 schematically illustrates a schematic diagram of a fingerprint image without fingerprint information in a fingerprint image sequence according to an embodiment of the present disclosure.

FIG. 13 schematically illustrates a schematic diagram of a fingerprint image without fingerprint information in a fingerprint image sequence according to an embodiment of the present disclosure. As shown in FIG. 13, there is a fingerprint image 1301 without fingerprint information in the fingerprint image sequence of this embodiment. The inventors have also found that, since it is difficult for a fake finger to produce the same contact surface as a real finger, a fingerprint image containing a partial non-fingerprint area is not liable to be acquired in a sliding process of the fake finger, but a fingerprint image with full fingerprint information or a fingerprint image without fingerprint information is liable to be acquired in a dragging and sliding process of a planar or similar planar fake finger. For example, in some application scenarios, when a real finger is lifted away from the fingerprint acquisition area, a fingerprint image containing a partial non-fingerprint area may be acquired; and when a fake finger is lifted away from the fingerprint acquisition area, a fingerprint image without fingerprint information may be acquired. In some embodiments, when the number of fingerprint images without fingerprint information in the fingerprint image sequence is greater than a third threshold, the target finger can be confirmed as a fake finger, and the third threshold can be 0.

Dynamic features of the fingerprint images containing partial non-fingerprint areas, possessed by a real finger, and dynamic features of the fingerprint image without fingerprint information, possessed by a fake finger, are exemplarily described above with reference to FIGS. 12 and 13, respectively, and signal intensity differences between previous and later fingerprint images in fingerprint image sequences of a real finger and a fake finger will be described below with reference to FIGS. 14a to 17b.

Figure 14A:
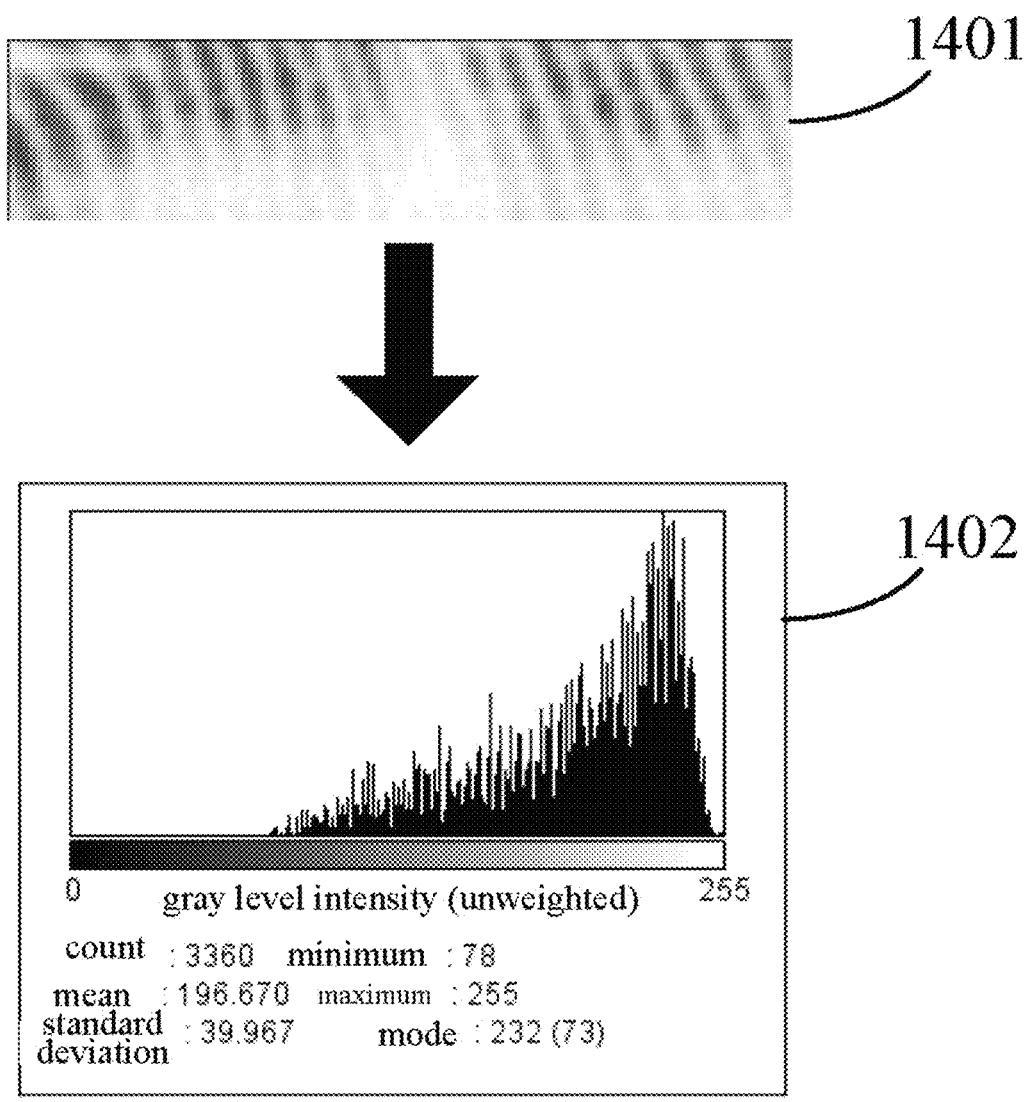
FIGS. 14a and 14b schematically illustrate a plurality of schematic diagrams of fingerprint images in a fingerprint image sequence of a real finger within a previous time period and their gray level distributions.
Figure 14B:
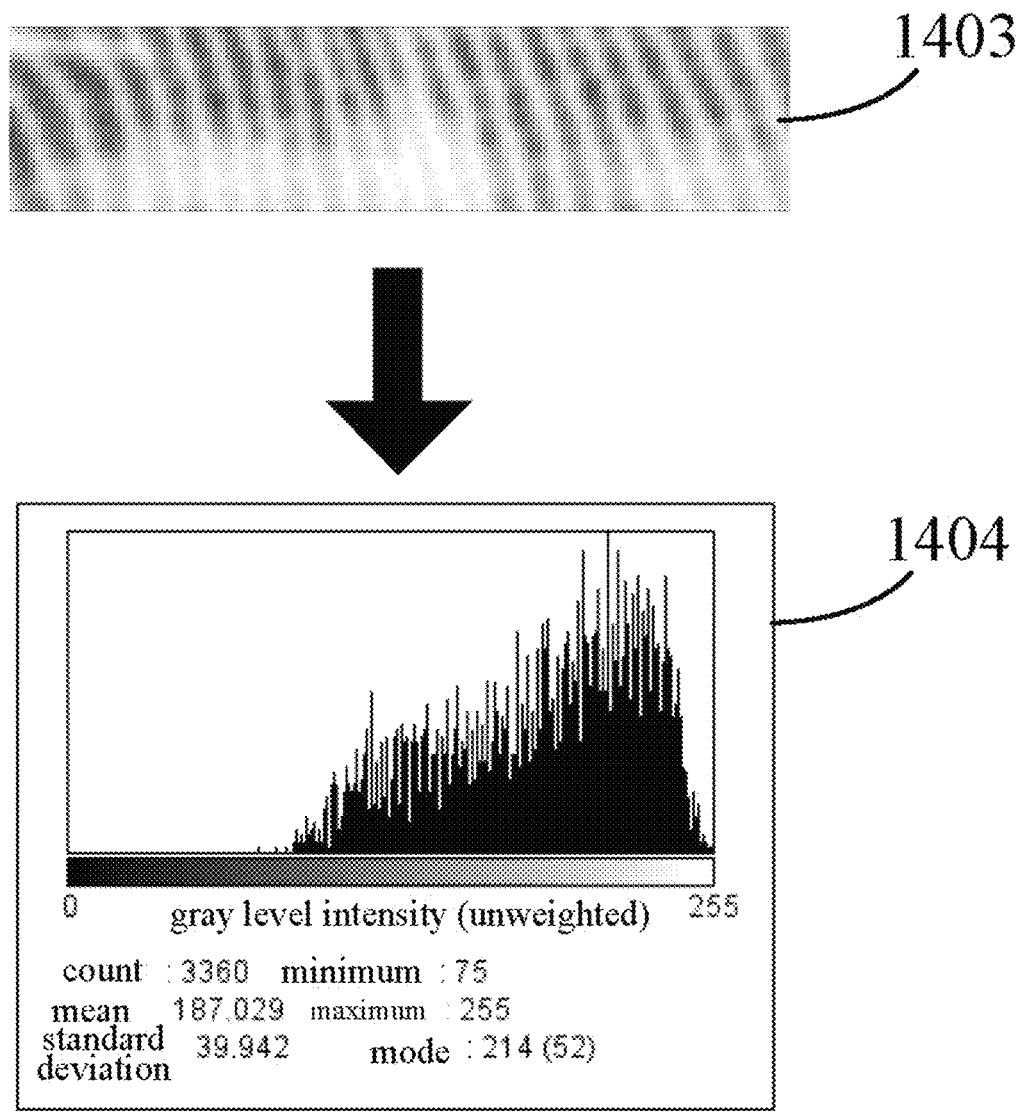

FIGS. 14a and 14b schematically illustrate a plurality of schematic diagrams of fingerprint images in a fingerprint image sequence of a real finger within a previous time period and their gray level distributions. As shown in FIG. 14a, by performing gray level analysis on the fingerprint image 1401, a gray level distribution graph 1402 can be obtained, with a standard deviation of 39.967. As shown in FIG. 14b, by performing gray level analysis on the fingerprint image 1403, a gray level distribution graph 1404 can be obtained, with a standard deviation of 39.942. A standard deviation mean of the gray level distribution graphs 1402 and 1404 is 39.9545.

Figure 15A:
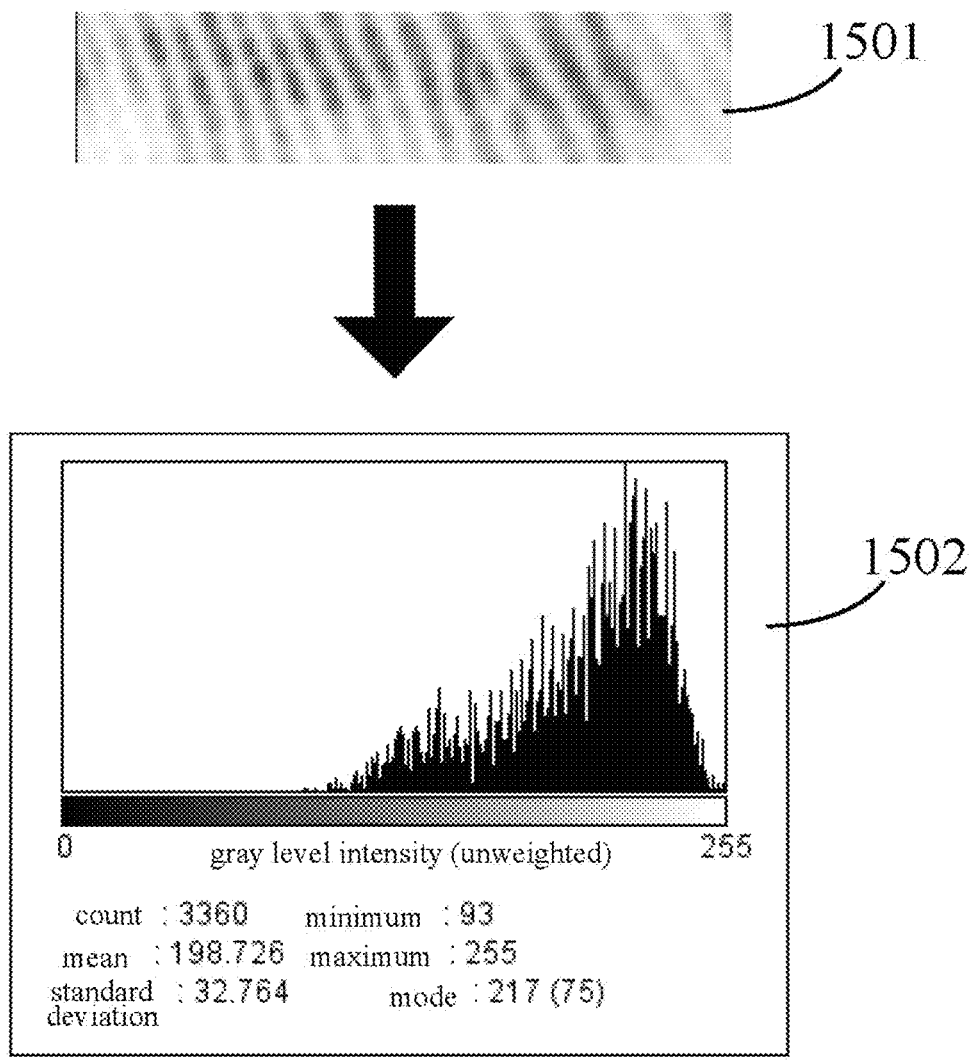
FIGS. 15a and 15b schematically illustrate a plurality of schematic diagrams of fingerprint images in a fingerprint image sequence of a real finger within a later time period and their gray level distributions.
Figure 15B:
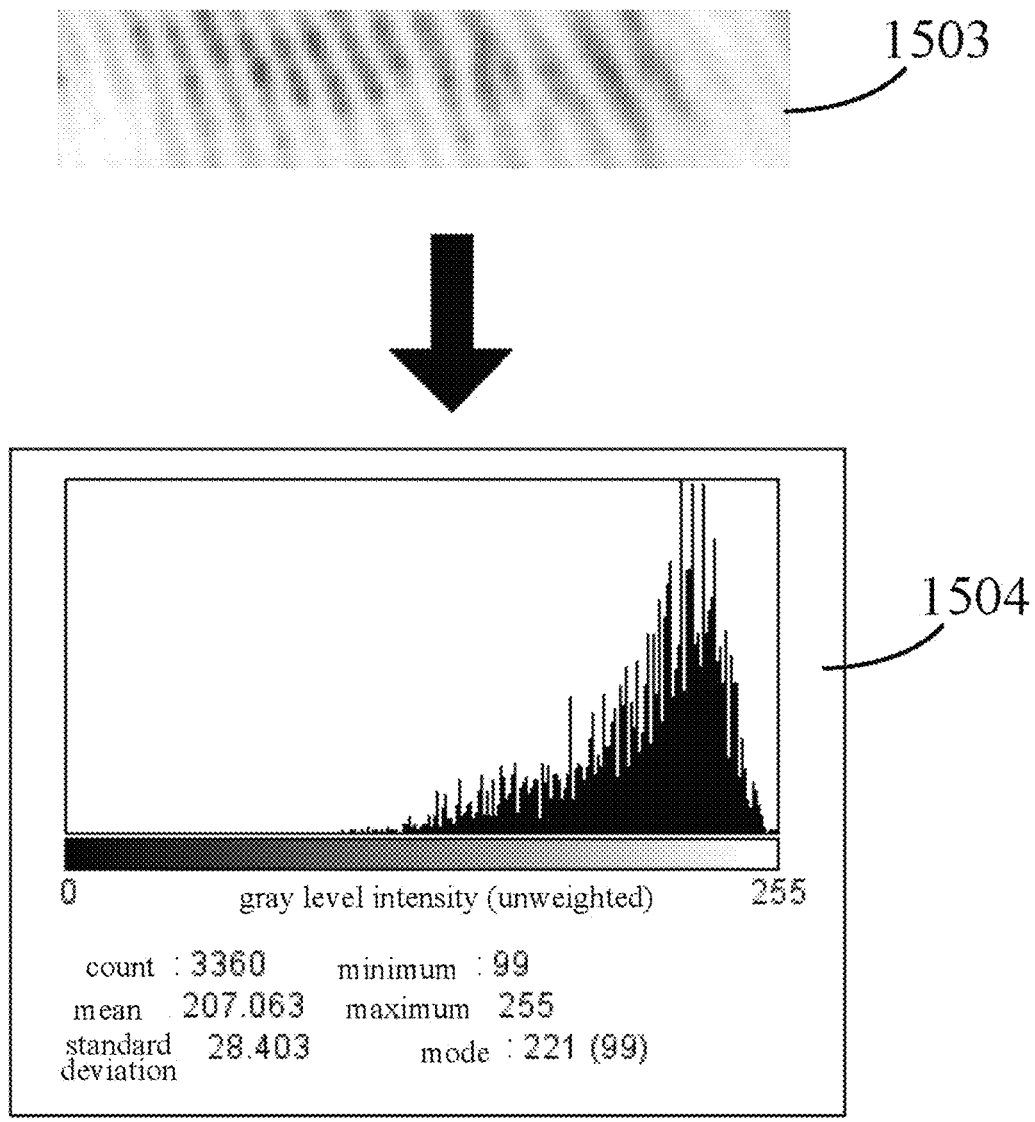

FIGS. 15a and 15b schematically illustrate a plurality of schematic diagrams of fingerprint images in a fingerprint image sequence of a real finger within a later time period and their gray level distributions. As shown in FIG. 15a, by performing gray level analysis on the fingerprint image 1501, a gray level distribution graph 1502 can be obtained, with a standard deviation of 32.764. As shown in FIG. 15b, by performing gray level analysis on the fingerprint image 1503, a gray level distribution graph 1504 can be obtained, with a standard deviation of 28.403. A standard deviation mean of the gray level distribution graphs 1502 and 1504 is 30.5835.

Taking the gray level distribution embodying the signal intensity distribution as an example, by comparing the standard deviations (for example, comparing the standard deviation 39.967 of the gray level distribution graph 1402 with the standard deviation 32.764 of the gray level distribution graph 1502), or the standard deviation means (for example, comparing the standard deviation mean 39.9545 within the previous time period with the standard deviation mean 30.5835 within the later time period) of the signal intensity distributions of the fingerprint images in the fingerprint image sequence of the real finger within previous and later different time periods, it can be seen that, in the fingerprint image sequence of the real finger, the signal intensity difference of the fingerprint images within previous and later different time periods is great.

Figure 16A:
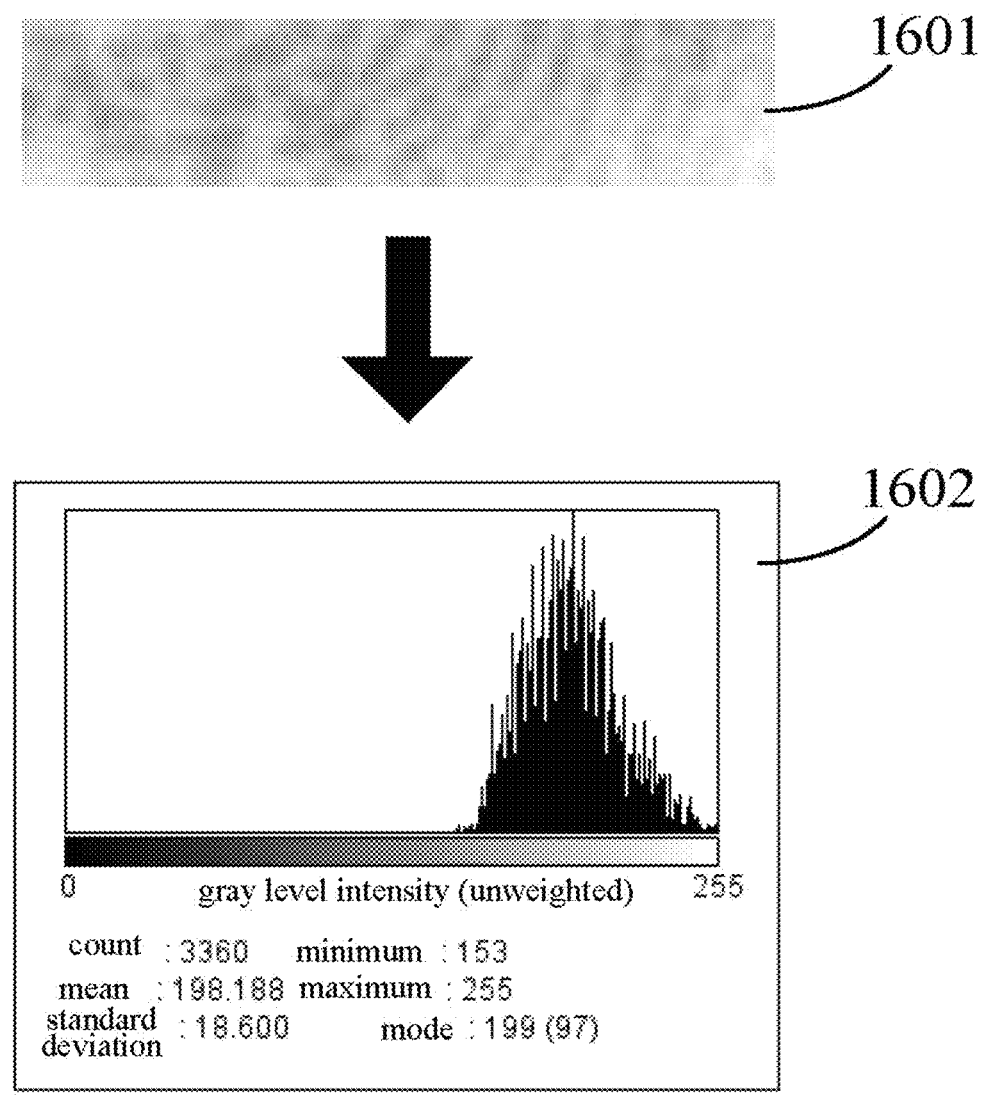
FIGS. 16a and 16b schematically illustrate a plurality of schematic diagrams of fingerprint images in a fingerprint image sequence of a fake finger within a previous time period and their gray level distributions.
Figure 16B:
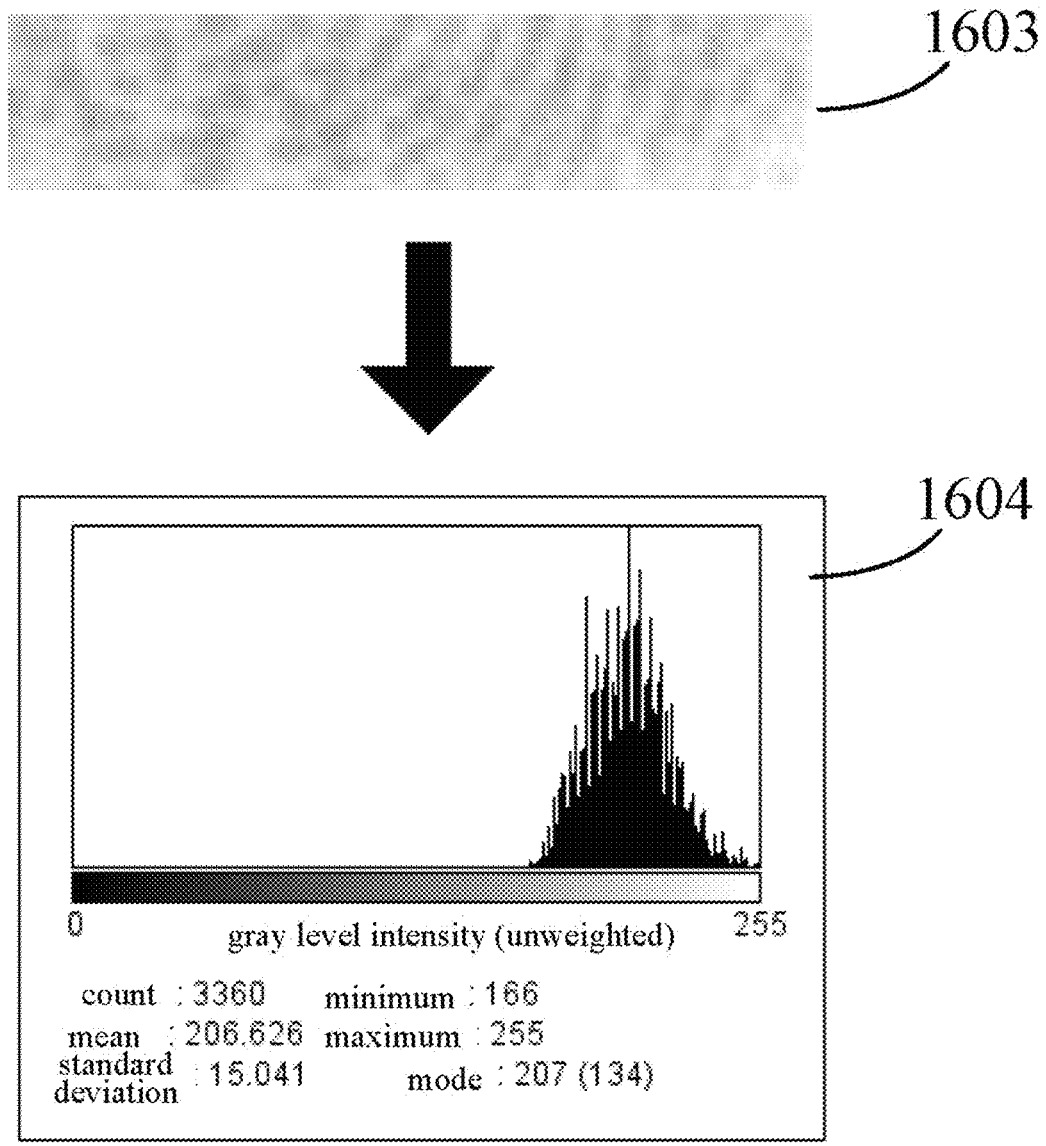

FIGS. 16a and 16b schematically illustrate a plurality of schematic diagrams of fingerprint images in a fingerprint image sequence of a fake finger within a previous time period and their gray level distributions. As shown in FIG. 16a, by performing gray level analysis on the fingerprint image 1601, a gray level distribution graph 1602 can be obtained, with a standard deviation of 18.600. As shown in FIG. 16b, by performing gray level analysis on the fingerprint image 1603, a gray level distribution graph 1604 can be obtained, with a standard deviation of 15.041. A standard deviation mean of the gray level distribution graphs 1602 and 1604 is 16.8205.

Figure 17A:
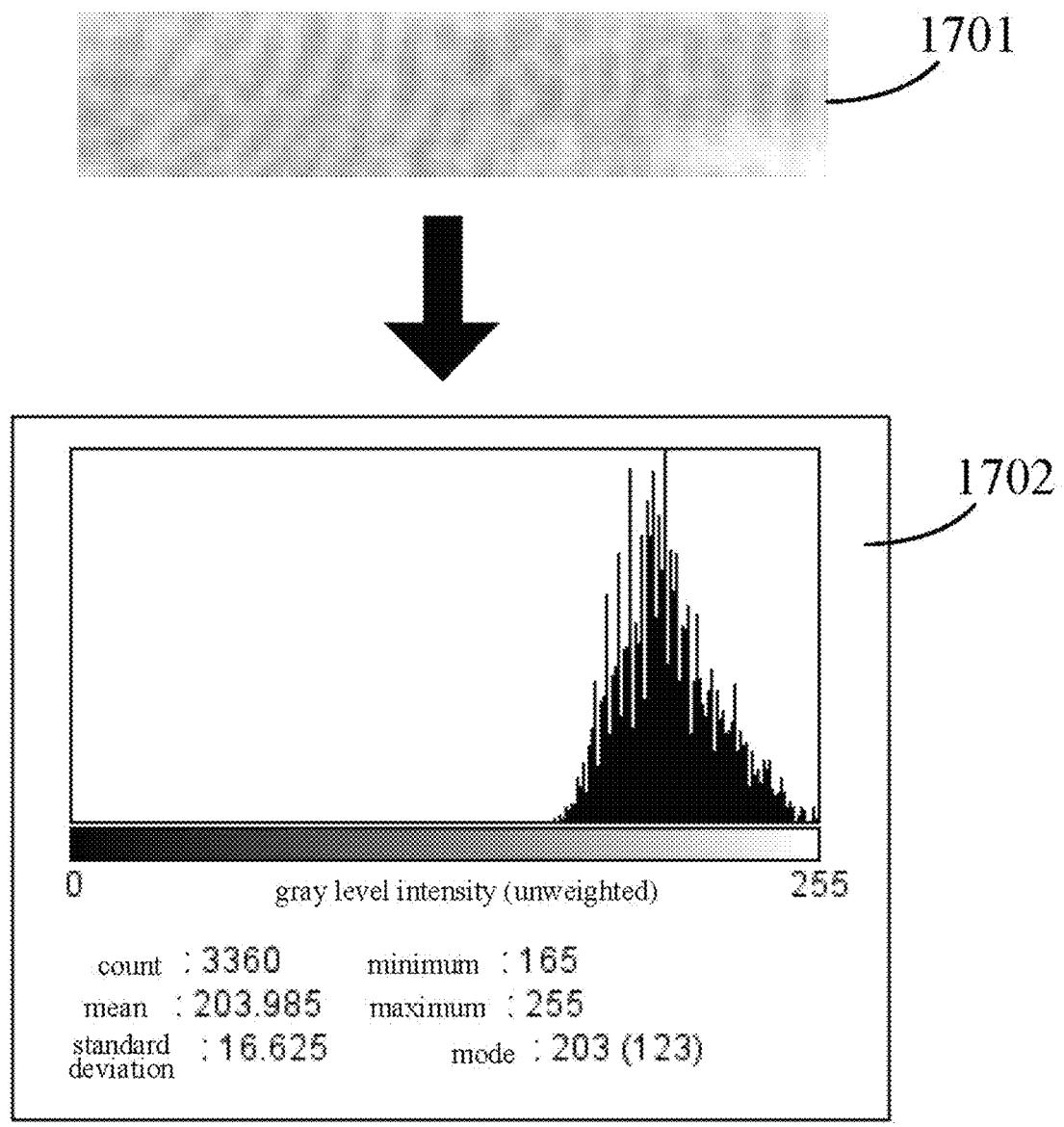
FIGS. 17a and 17b schematically illustrate a plurality of schematic diagrams of fingerprint images in a fingerprint image sequence of a fake finger within a later time period and their gray level distributions.
Figure 17B:
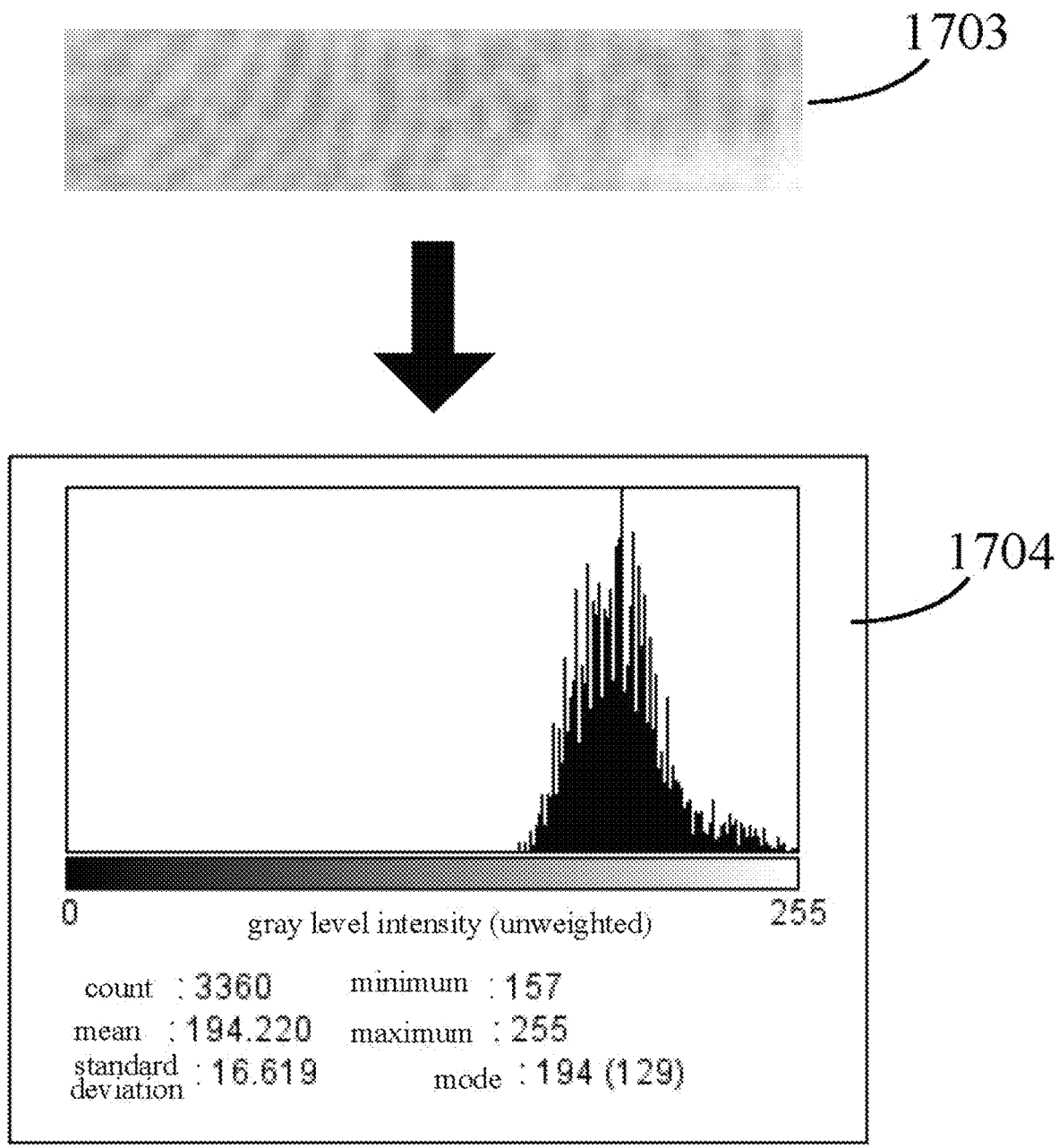

FIGS. 17a and 17b schematically illustrate a plurality of schematic diagrams of fingerprint images in a fingerprint image sequence of a fake finger within a later time period and their gray level distributions. As shown in FIG. 17a, by performing gray level analysis on the fingerprint image 1701, a gray level distribution graph 1702 can be obtained, with a standard deviation of 16.625. As shown in FIG. 17b, by performing gray level analysis on the fingerprint image 1703, a gray level distribution graph 1704 can be obtained, with a standard deviation of 16.619. A standard deviation mean of the gray level distribution graphs 1702 and 1704 is 16.622.

Taking the gray level distribution embodying the signal intensity distribution as an example, by comparing the standard deviations (for example, comparing the standard deviation 18.600 of the gray level distribution graph 1602 with the standard deviation 16.625 of the gray level distribution graph 1702), or the standard deviation means (for example, comparing the standard deviation mean 16.8205 of FIGS. 16a and 16b with the standard deviation mean 16.622 of FIGS. 17a and 17b) of the signal intensity distributions of the fingerprint images in the fingerprint image sequence of the fake finger within previous and later different time periods, it can be seen that, in the fingerprint image sequence of the fake finger, the signal intensities of the fingerprint images within the previous and later different time periods are relatively close.

By comparing the standard deviations or the standard deviation means of the signal intensity distributions of the fingerprint images in the fingerprint image sequences of the real finger and the fake finger within the previous and later different time periods, it can be seen that, in the fingerprint image sequence of the fake finger, the signal intensity difference between the previous and later fingerprint images is little. This may result from a soft and non-planar texture of the real finger, which causes different forces in the process that the real finger is contacted with the fingerprint acquisition area and slides thereon, thereby generating different signal intensities; in contrast, the fake finger usually has a hard texture, particularly a planar fake finger will cause a little difference in forces in the process that the fake finger is contacted with the fingerprint acquisition area and slides thereon, thereby generating relatively close signal intensities. Therefore, based on a logic that the signal intensity difference of the fingerprint images in the fingerprint image sequence within previous and later different time periods is less than the fourth threshold, it is accurate and reliable to determine the target finger as a fake finger.

Figure 18:
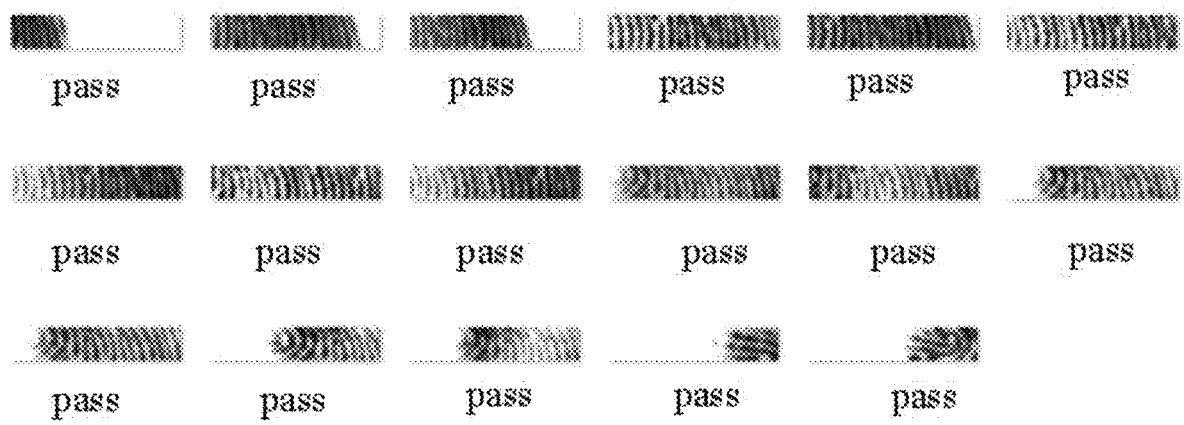
FIG. 18 schematically illustrates a schematic diagram of a fingerprint image sequence in a continuous matching hit state according to an embodiment of the present disclosure.

FIG. 18 schematically illustrates a schematic diagram of a fingerprint image sequence in a continuous matching hit state according to an embodiment of the present disclosure. As shown in FIG. 18, the matching of all fingerprint images in the fingerprint image sequence in this embodiment with the enrolled fingerprint information can be passed, i.e., the fingerprint image sequence is in a continuous matching hit state.

Figure 19:
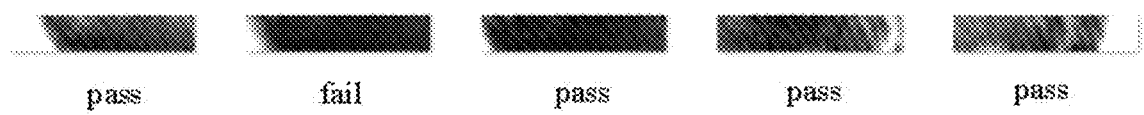
FIG. 19 schematically illustrates a schematic diagram of a fingerprint image sequence in a non-continuous matching hit state according to an embodiment of the present disclosure.

FIG. 19 schematically illustrates a schematic diagram of a fingerprint image sequence in a non-continuous matching hit state according to an embodiment of the present disclosure. As shown in FIG. 19, the matching of the fingerprint images in the fingerprint image sequence in this embodiment with the enrolled fingerprint information is passed first, then fails, and finally passed, i.e., the fingerprint image sequence is in a non-continuous matching hit state.

Practice has proved that, when a real finger is contacted with the fingerprint acquisition area (such as a fingerprint sensor) and performs pressing and sliding operations, the quality of the acquired fingerprint image is stable, and thus, once the fingerprint image in the fingerprint image sequence hits, it is liable to be in a continuous hit state before the target finger leaves the fingerprint acquisition area. However, when a fake finger is contacted with the fingerprint acquisition area, since the quality of the acquired fingerprint image is unstable, it is liable to be in a non-continuous matching hit state in the fingerprint image sequence. Therefore, based on a logic that the fingerprint image sequence is in a non-continuous matching hit state, it is accurate and reliable to determine that the target finger is a fake finger.

After introducing the method of the exemplary embodiments of the present disclosure, a device for fingerprint authentication of the exemplary embodiments of the present disclosure will be described below with reference to FIG. 20.

Figure 20:
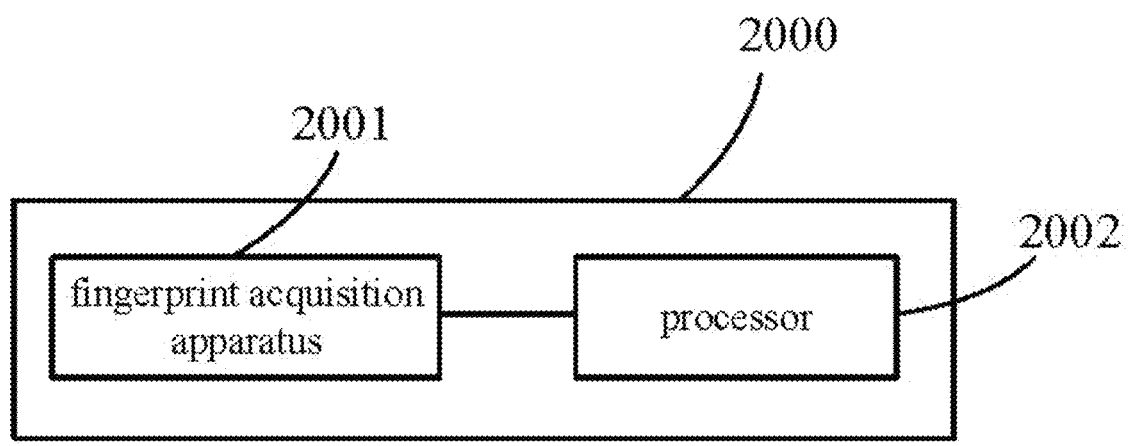
FIG. 20 schematically illustrates a block diagram of a device for fingerprint authentication according to an embodiment of the present disclosure.

FIG. 20 schematically illustrates a block diagram of the device for fingerprint authentication according to an embodiment of the present disclosure. In a second aspect of the present disclosure, there is provided a device 2000 for fingerprint authentication, and as shown in FIG. 20, the device 2000 can include a fingerprint acquisition apparatus 2001 and a processor 2002, wherein: the processor 2002 is configured to: in response to receiving an authentication request, control the fingerprint acquisition apparatus 2001 to perform fingerprint image acquisition in a first mode and perform comparison in the first mode based on an acquired fingerprint image, and selectively control the fingerprint acquisition apparatus 2001 to perform fingerprint image acquisition in a second mode and perform comparison in the second mode based on an acquired fingerprint image sequence; and perform authentication at least based on a comparison result of the first mode; and the fingerprint acquisition apparatus 2001 is configured to: in the first mode, acquire the fingerprint image generated by a pressing operation of a target finger in a fingerprint acquisition area; or in the second mode, acquire the fingerprint image sequence generated by a sliding operation of the target finger in the fingerprint acquisition area.

The device according to the embodiments of the present disclosure has been described and explained in detail above in conjunction with the method, which will not be repeated herein. It should be noted that, the human-machine interface described above can be presented in a visual, auditory, etc. manner, and can include but be not limited to, for example, a display, a speaker, etc.

Through the above description of the embodiments, it will be clearly understood by those skilled in the art that, each embodiment can be achieved by means of software plus a necessary general hardware platform, and of course, by means of hardware. Those of ordinary skill in the art would appreciate that: all or some of the steps for implementing the method embodiments described above in conjunction with FIGS. 1 to 19 can be performed by hardware related to program instructions, and the foregoing program instructions can be stored in a non-transitory computer-readable medium, and perform the steps of the method embodiments described above when executed.

The computer readable medium can be, but is not limited to, an electronic, magnetic, optical, electromagnetic, infrared, or semiconductor system, apparatus, or device, or any combination of the foregoing. More specific examples (a non-exhaustive list) of the readable storage medium include: an electrical connection having one or more wires, a portable disk, a hard disk, a random access memory (RAM), a read-only memory (ROM), an erasable programmable read-only memory (EPROM or flash memory), an optical fiber, a portable compact disc read-only memory (CD-ROM), a static random access memory (SRAM), a digital versatile disc (DVD), an optical storage device, a magnetic storage device, or any suitable combination of the foregoing. Any such computer storage medium can be a part of the device, or accessible or connectable to the device. Any application or module described in this disclosure can be implemented using computer-readable/executable instructions stored by such a computer-readable medium or otherwise maintained.

Through the above description of the technical solutions and various embodiments of the method and device for fingerprint authentication of the present disclosure, it can be understood by those skilled in the art that, the disclosed method for fingerprint authentication can provide an authentication method with selectable security levels, and when selecting to perform the fingerprint image acquisition and comparison of the second mode, the accuracy and security of fingerprint authentication can be effectively improved, so that the method according to the embodiments of the present disclosure can not only meet a requirement for fast authentication in some application scenarios, but also meet a requirement for high security level authentication in other application scenarios.

In some embodiments, the method of the embodiments of the present disclosure can perform fingerprint identification in the first mode, and perform real/fake finger identification in the second mode, so that fingerprint features and fingerprint sources of the target finger can be more comprehensively and accurately judged, which is beneficial to reduce the misjudgment ratio of the authentication result and improve the accuracy of the authentication result. In other embodiments, the method of the embodiments of the present disclosure can further determine whether the target finger is a fake finger according to at least one of static features and dynamic features in the fingerprint image sequence in the second mode, so as to achieve real/fake finger identification finely and accurately.

Although the embodiments of the present disclosure have been described above, they are merely the embodiments used for facilitating understanding the present disclosure, and are not intended to limit the scope and application scenarios of the present disclosure. Anyone skilled in the art of the present disclosure can make any modification and variation in implementation forms and details without departing from the spirit and scope revealed in the present disclosure, but the patent protection scope of the present disclosure shall still be subject to the scope defined in the attached claims.

What is claimed is:

1. A device for fingerprint authentication, comprising a fingerprint acquisition apparatus and a processor, wherein:
the processor is configured to:
in response to receiving an authentication request, control the fingerprint acquisition apparatus to perform fingerprint image acquisition in a first mode and perform comparison in the first mode based on an acquired fingerprint image, and selectively control the fingerprint acquisition apparatus to perform fingerprint image acquisition in a second mode and perform comparison in the second mode based on an acquired fingerprint image sequence; and
perform authentication at least based on a comparison result of the first mode; and
the fingerprint acquisition apparatus is configured to:
in the first mode, acquire the fingerprint image generated by a pressing operation of a target finger in a fingerprint acquisition area; or
in the second mode, acquire the fingerprint image sequence generated by a sliding operation of the target finger in the fingerprint acquisition area.

2. The device according to claim 1, wherein the processor is further configured to:
in response to the authentication request being at a normal level, perform authentication based on the comparison result of the first mode.

3. The device according to claim 1, wherein the processor is further configured to:
in response to the authentication request being at a strict level, perform authentication based on the comparison results of the first mode and the of second mode.

4. The device according to claim 3, further comprises:
a human-machine interface configured to present, under control of the processor, a prompt message for instructing the target finger to perform the sliding operation after in response to the authentication request being at a strict level; or
presenting a prompt message for instructing the target finger to press first then slide.

5. The device according to claim 1, wherein the processor is further configured to:
in the first mode, perform comparison of the fingerprint image with enrolled fingerprint information for fingerprint identification; and/or
in the second mode, perform real/fake finger identification based on the fingerprint image sequence.

6. The device according to claim 1, further comprises:
a human-machine interface configured to present, under control of the processor, a prompt message for instructing the target finger to perform at least the pressing operation before performing fingerprint image acquisition of the first mode.

7. The device according to claim 1, wherein the processor is further configured to:
in response to the comparison result of the first mode being passed, determine a level of the authentication request; and
the device further comprises:
a human-machine interface configured to present, under control of the processor, a prompt message for instructing the target finger to perform the sliding operation after in response to the level being a strict level.

8. The device according to claim 1, wherein the processor is further configured to:
upon receiving the authentication request, determine a level of the authentication request; and
the device further comprises:
a human-machine interface configured to present, under control of the processor, a prompt message for instructing the target finger to perform the pressing operation after in response to the level being a strict level; and
in response to the comparison result of the first mode being passed, presenting a prompt message for instructing the target finger to perform the sliding operation.

9. The device according to claim 1, wherein the processor is further configured to:
upon receiving the authentication request, determining a level of the authentication request; and
the device further comprises:
a human-machine interface configured to present, under control of the processor, a prompt message for instructing the target finger to perform a pressing-first-then-sliding operation after in response to the level being a strict level.

10. A method for fingerprint authentication, the method comprising:
in response to receiving an authentication request, performing fingerprint image acquisition and comparison of a first mode, and selectively performing fingerprint image acquisition and comparison of a second mode, wherein in the first mode, a fingerprint image generated by a pressing operation of a target finger in a fingerprint acquisition area is acquired, and in the second mode, a fingerprint image sequence generated by a sliding operation of the target finger in the fingerprint acquisition area is acquired; and
performing authentication at least based on a comparison result of the first mode.

11. The method according to claim 10, further comprising:
in response to the authentication request being at a normal level, performing authentication based on the comparison result of the first mode.

12. The method according to claim 10, further comprising:
in response to the authentication request being at a strict level, performing authentication based on the comparison results of the first mode and of the second mode.

13. The method according to claim 12, further comprising, after in response to the authentication request being at a strict level:

presenting a prompt message for instructing the target finger to perform the sliding operation; or presenting a prompt message for instructing the target finger to press first then slide.

14. The method according to claim 10, wherein:

in the first mode, comparing the fingerprint image with enrolled fingerprint information for fingerprint identification; and/or in the second mode, performing real/fake finger identification based on the fingerprint image sequence.

15. The method according to claim 10, wherein before performing fingerprint image acquisition and comparison of the first mode, the method further comprises:

presenting a prompt message for instructing the target finger to perform at least the pressing operation.

16. The method according to claim 10, further comprising:

in response to the comparison result of the first mode being passed, determining a level of the authentication request; and in response to the level being a strict level, presenting a prompt message for instructing the target finger to perform the sliding operation.

17. The method according to claim 10, further comprising:

upon receiving the authentication request, determining a level of the authentication request;

in response to the level being a strict level, presenting a prompt message for instructing the target finger to perform the pressing operation; and in response to the comparison result of the first mode being passed, presenting a prompt message for instructing the target finger to perform the sliding operation.

18. The method according to claim 10, further comprising:

upon receiving the authentication request, determining a level of the authentication request; and in response to the level being a strict level, presenting a prompt message for instructing the target finger to perform a pressing-first-then-sliding operation.

19. The method according to claim 10, wherein that performing fingerprint image acquisition and comparison of a second mode comprises:

in response to the sliding operation of the target finger in the fingerprint acquisition area, acquiring the fingerprint image sequence generated by the target finger in a sliding process;

extracting static features of each fingerprint image in the fingerprint image sequence and/or dynamic features of the fingerprint image sequence; and determining whether the target finger is a fake finger based on the static features and/or the dynamic features.

20. The method according to claim 19, wherein that extracting the static features comprises at least one of:

generating global gray level distributions of the fingerprint images;

generating local gray level distributions of the fingerprint images; and extracting burr features of ridges in the fingerprint images.

21. The method according to claim 19, wherein that extracting the dynamic features comprises at least one of:

counting the number of fingerprint images containing partial non-fingerprint areas in the fingerprint image sequence;

counting the number of fingerprint images without fingerprint information in the fingerprint image sequence;

counting a signal intensity difference between previous and later fingerprint images in the fingerprint image sequence; and determining a continuous matching hit state of the fingerprint image sequence.

22. The method according to claim 21, wherein that counting a signal intensity difference between previous and later fingerprint images in the fingerprint image sequence comprises:

calculating standard deviations or standard deviation means of signal intensity distributions of fingerprint images in the fingerprint image sequence within previous and later different time periods; and comparing a difference between the standard deviations or the standard deviation means to obtain the signal intensity difference.

23. The method according to claim 21, wherein that determining a continuous matching hit state of the fingerprint image sequence comprises:

matching each fingerprint image in the fingerprint image sequence with enrolled fingerprint information to generate a matching result;

in response to the matching result conforming to a first pattern, determining that the fingerprint image sequence is in a continuous matching hit state; and in response to the matching result conforming to a second pattern, determining that the fingerprint image sequence is in a non-continuous matching hit state.

24. The method according to claim 19, wherein that determining whether the target finger is a fake finger based on the static features and/or the dynamic features comprises:

based on the static features and/or the dynamic features, judging whether the target finger is a fake finger using a machine model trained in advance or according to a preset logic.

25. The method according to claim 24, wherein the preset logic comprises determining the finger as a fake finger when at least one of the following is satisfied:

a percentage of the number of fingerprint images in the fingerprint image sequence which are confirmed to belong to a fake finger based on the static features exceeding a first threshold;

the number of fingerprint images containing partial non-fingerprint areas in the fingerprint image sequence being less than a second threshold;

the number of fingerprint images without fingerprint information in the fingerprint image sequence being greater than a third threshold;

a signal intensity difference between previous and later fingerprint images in the fingerprint image sequence being less than a fourth threshold; and the fingerprint image sequence being in a non-continuous matching hit state.

26. The method according to claim 25, wherein that based on the static features, confirming the finger as a fake finger comprises:

according to the static features of each fingerprint image, detecting whether each fingerprint image has a fake finger feature; and in response to detecting the fake finger feature, confirming that the fingerprint image belongs to a fake finger.

27. The method according to claim 26, wherein the fake finger feature comprises at least one of:

a distribution range of a global gray level distribution of the fingerprint image being less than a fifth threshold;

a distribution range of a local gray level distribution of the fingerprint image being less than a sixth threshold; and ridges in the fingerprint image having burr features.

28. A non-transitory computer-readable storage medium having stored thereon program instructions for fingerprint authentication, which when executed by at least one processor, cause to:
- in response to receiving an authentication request, control performing fingerprint image acquisition and comparison in a first mode and selectively performing fingerprint image acquisition and comparison in a second mode, wherein in the first mode, a fingerprint image generated by a pressing operation of a target finger in a fingerprint acquisition area is acquired, and in the second mode, a fingerprint image sequence generated by a sliding operation of the target finger in the fingerprint acquisition area is acquired; and
- perform authentication at least based on a comparison result of the first mode.

* * * * *